US012556917B2

(12) United States Patent
Singh et al.

(10) Patent No.: US 12,556,917 B2
(45) Date of Patent: Feb. 17, 2026

(54) SOFTWARE STACK AND BACKEND FOR PASSIVE WEARABLE METASURFACES FOR REMOTE MANAGEMENT AND ANALYTICS

(71) Applicant: Dell Products L.P., Round Rock, TX (US)

(72) Inventors: Tejinder Singh, Manotick (CA); Navjot Kaur Khaira, Manotick (CA)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/776,018

(22) Filed: Jul. 17, 2024

(65) Prior Publication Data

US 2026/0025655 A1    Jan. 22, 2026

(51) Int. Cl.
    *H04W 12/06*    (2021.01)
(52) U.S. Cl.
    CPC ................................. *H04W 12/06* (2013.01)
(58) Field of Classification Search
    CPC ....................................................... H04W 12/06
    See application file for complete search history.

(56) References Cited

U.S. PATENT DOCUMENTS

| | | | | |
|---|---|---|---|---|
| 10,038,690 | B2* | 7/2018 | Andrews | ............ H04L 63/0876 |
| 10,193,880 | B1* | 1/2019 | Jiang | ...................... H04L 63/08 |
| 11,074,488 | B2 | 7/2021 | Klimt | |
| 11,340,392 | B1 | 5/2022 | Wollack et al. | |
| 2005/0038994 | A1* | 2/2005 | Johnson | ................... G06F 21/41 713/165 |
| 2007/0091004 | A1 | 4/2007 | Puuri | |
| 2016/0028715 | A1* | 1/2016 | Sivashanmugam | ......................... H04L 63/0861 726/7 |

(Continued)

OTHER PUBLICATIONS

Notice of Allowance mailed Mar. 21, 2025 for U.S. Appl. No. 18/780,245, 25 pages.

(Continued)

*Primary Examiner* — Darren B Schwartz
(74) *Attorney, Agent, or Firm* — Amin, Turocy & Watson, LLP

(57) ABSTRACT

The technology described herein is directed towards automatically completing two-factor authentication based on detection of a distinct metasurface of a wearable (or other) device associated with a user. A software stack and backend connection facilitate completing a two-factor authentication request. The wearable device includes a passive metasurface that interacts with a transceiver coupled to a computing device or computer peripheral. The transceiver transmits a wireless RF signal towards the metasurface integrated into the wearable device, whereby the metasurface reflects an altered instance of the incoming signal back to the transceiver. The radiation pattern of the reflected signal is distinctly altered per metasurface, providing a distinct metasurface signature that can be detected by a computing device expecting that signature. The receipt of an expected, matched signal's signature at the computing device authenticates the user, whereby the computing device operates to automatically complete the two-factor authentication request on the user's behalf.

20 Claims, 18 Drawing Sheets

(56) References Cited

U.S. PATENT DOCUMENTS

| | | | |
|---|---|---|---|
| 2019/0132399 A1* | 5/2019 | Henning | H04L 63/10 |
| 2020/0005113 A1 | 1/2020 | Schnippering | |
| 2020/0042977 A1 | 2/2020 | Boulby | |
| 2020/0403647 A1* | 12/2020 | Bit-Babik | H01Q 1/362 |
| 2021/0258314 A1* | 8/2021 | Tabaja | H04L 63/0838 |
| 2023/0155812 A1* | 5/2023 | Bennison | H04L 63/0876 |
| | | | 713/171 |
| 2023/0386245 A1 | 11/2023 | Tada | |
| 2024/0402342 A1 | 12/2024 | Knapp et al. | |
| 2025/0078593 A1 | 3/2025 | Beuchat et al. | |

OTHER PUBLICATIONS

Singh, et al. "Passive Wearable Device for Security and Authentication" U.S. Appl. No. 18/775,968, filed Jul. 17, 2024, 39 pages.

Singh, et al. "Scalable and Compact Metasurface Design for Smart and Functional Wearable Devices" U.S. Appl. No. 18/775,979, filed Jul. 17, 2024, 39 pages.

Singh, et al. "Integrated Physical Device Identification for Remote Management of Wearable Metasurfaces" U.S. Appl. No. 18/775,984, filed Jul. 17, 2024, 41 pages.

Singh, et al. "Differentiating Physical Radiation Patterns in Passive Metasurfaces" U.S. Appl. No. 18/775,993, filed Jul. 17, 2024, 40 pages.

Singh, et al. "Customization and Appearance Information for Wearable Metasurfaces" U.S. Appl. No. 18/775,999, filed Jul. 17, 2024, 41 pages.

Singh, et al. "Computer Peripheral With Embedded Transceiver for Proximity Detection of Wearable Metasurfaces" U.S. Appl. No. 18/776,001, filed Jul. 17, 2024, 40 pages.

Singh, et al. "Proximity Based Multifactor Authentication Using Passive Wearable Metasurfaces" U.S. Appl. No. 18/776,007, filed Jul. 17, 2024, 46 pages.

Singh, et al. "Automatic Computing Device Wake up and Lock Using Passive Wearable Metasurface" U.S. Appl. No. 18/776,011, filed Jul. 17, 2024, 45 pages.

Singh, et al. "Activation and Deactivation Detection for a Passive Wearable Metasurface Using a Segmented Ground Plane" U.S. Appl. No. 18/780,245, filed Jul. 22, 2024, 42 pages.

Singh, et al. "Design and Deployment of a Wearable Metasurface With a Segmented Ground Plane" U.S. Appl. No. 18/780,263, filed Jul. 22, 2024, 39 pages.

Singh, et al. "Compact Transceiver With Advanced Beam-Scanning Functionality Based On Leaky Wave Antenna" U.S. Appl. No. 18/780,280, filed Jul. 22, 2024, 37 pages.

Singh, et al. "Aperture Reconfiguration for Transceiver With Beam-Scanning Capability" U.S. Appl. No. 18/780,284, filed Jul. 22, 2024, 37 pages.

Office Action mailed Dec. 10, 2025 for U.S. Appl. No. 18/775,968, 34 pages.

Office Action mailed Dec. 10, 2025 for U.S. Appl. No. 18/775,984, 28 pages.

Notice of Allowance mailed Oct. 21, 2025 for U.S. Appl. No. 18/776,007, 43 pages.

* cited by examiner

SOFTWARE STACK AND BACKEND FOR PASSIVE WEARABLE METASURFACES FOR REMOTE MANAGEMENT AND ANALYTICS

RELATED APPLICATIONS

The subject patent application is related to U.S. patent application Ser. No. 18/775,968, filed Jul. 17, 2024, and entitled "PASSIVE WEARABLE DEVICE FOR SECURITY AND AUTHENTICATION", U.S. patent application Ser. No. 18/775,979, filed Jul. 17, 2024, and entitled "SCALABLE AND COMPACT METASURFACE DESIGN FOR SMART AND FUNCTIONAL WEARABLE DEVICES", U.S. patent application Ser. No. 18/775,984, filed Jul. 17, 2024, and entitled "INTEGRATED PHYSICAL DEVICE IDENTIFICATION FOR REMOTE MANAGEMENT OF WEARABLE METASURFACES", U.S. patent application Ser. No. 18/775,993, filed Jul. 17, 2024, and entitled "DIFFERENTIATING PHYSICAL RADIATION PATTERNS IN PASSIVE METASURFACES", U.S. patent application Ser. No. 18/775,999, filed Jul. 17, 2024, and entitled "CUSTOMIZATION AND APPEARANCE INFORMATION FOR WEARABLE METASURFACES", U.S. patent application Ser. No. 18/776,001, filed Jul. 17, 2024, and entitled "COMPUTER PERIPHERAL WITH EMBEDDED TRANSCEIVER FOR PROXIMITY DETECTION OF WEARABLE METASURFACES", U.S. patent application Ser. No. 18/776,007, filed Jul. 17, 2024, and entitled "PROXIMITY BASED MULTIFACTOR AUTHENTICATION USING PASSIVE WEARABLE METASURFACES", and U.S. patent application Ser. No. 18/776,011, filed Jul. 17, 2024, and entitled "AUTOMATIC COMPUTING DEVICE WAKE UP AND LOCK USING PASSIVE WEARABLE METASURFACE", the entireties of which patent applications are hereby incorporated by reference herein.

BACKGROUND

Today, many websites and applications require the user to set a second layer of authentication, for example using a two-factor application such as Microsoft® Authenticator or similar application that can generate random digit codes to link to the user's account to provide authenticity. A physical multifactor authentication device (e.g., a FIDO (Fast IDentity Online)-based YubiKey® or the like) can be used but this adds expense and is not well known or owned by many users. Two-factor authentication thus adds frustration, requires users to remember their passwords and carry their phones all the time, and adds significant delays.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1A:
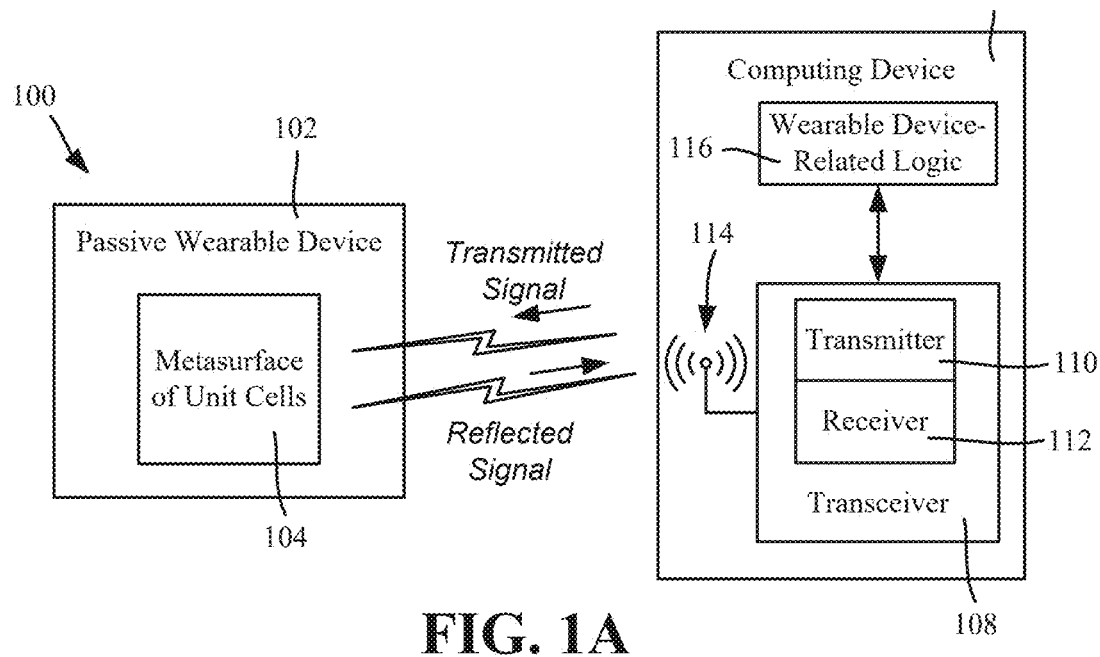
FIG. 1A is a block diagram representation of an example wearable device including a passive metasurface communicating with a computing device via an embedded transceiver, in accordance with various example embodiments and implementations of the subject disclosure.

The technology described herein is generally directed towards automatic multifactor authentication via a wearable or otherwise portable metasurface that is capable of interacting with a receiver connected to a computing device, such as a personal computer or laptop. A software stack, which can include an interface, and backend connections to programs/services facilitates automatic completion of a two-factor authentication request.

In one implementation, the receiver is part of a dedicated transceiver that can be embedded into or otherwise coupled to the computing device. The transceiver, serving as the system's active component, emits a wireless radio frequency signal towards a metasurface integrated into the wearable device. Upon receiving the signal, the metasurface alters the incoming signal's properties in a predefined manner, and redirects (reflects) the altered instance of the signal back to the transceiver. The receipt of the altered signal at the computing device facilitates detecting the proximity of the user, as well as possibly other actions such as authenticating the user, providing a seamless and intuitive user experience that is both efficient and secure. For example, the computing device can wake up or lock based on the presence or absence of the authenticated user, respectively.

The wearable device embedded with a metasurface or with a metasurface affixed thereto, can become a component in a user's daily attire, for example. Significantly, the wearable device and metasurface can be passive, requiring no internal or external power source to operate as a reflecting device, which among other uses can be used for automatic authentication.

The automatic authentication system leverages proximity detection technology via the metasurface to seamlessly authenticate users without any user intervention, which eliminates the need for user manual input. Authentication is security protected via a distinct (e.g., system unique) device/metasurface identifier (ID) recognized via the embedded transceiver and computing device. The technology described herein thus provides a robust yet user-friendly authentication technique via a proximity-based application designed to streamline authentication processes and enhance the overall user experience. In the event that metasurface-based proximity detection is not available, e.g., the user has forgotten to wear or misplaced the metasurface, the system offers conventional authentication methods (e.g., email, text messaging, or two-factor authentication from an application) as backup options, providing users with flexibility and peace of mind.

It should be understood that any of the examples and/or descriptions herein are non-limiting. Thus, any of the embodiments, example embodiments, concepts, structures, functionalities or examples described herein are non-limiting, and the technology may be used in various ways that provide benefits and advantages in RF communications and RF devices in general.

Reference throughout this specification to "one embodiment," "an embodiment," "one implementation," "an implementation," etc. means that a particular feature, structure, characteristic and/or attribute described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, characteristics and/or attributes may be combined in any suitable manner in one or more embodiments/implementations. Repetitive description of like elements employed in respective embodiments may be omitted for sake of brevity.

The detailed description is merely illustrative and is not intended to limit embodiments and/or application or uses of embodiments. Furthermore, there is no intention to be bound by any expressed or implied information presented in the preceding sections, or in the Detailed Description section. Further, it is to be understood that the present disclosure will be described in terms of a given illustrative architecture; however, other architectures, structures, materials and process features, and steps can be varied within the scope of the present disclosure.

It also should be noted that terms used herein, such as "optimize," "optimization," "optimal," "optimally" and the like only represent objectives to move towards a more optimal state, rather than necessarily obtaining ideal results. Similarly, "maximize" means moving towards a maximal state (e.g., up to some processing capacity limit), not necessarily achieving such a state, and so on.

It will also be understood that when an element such as a layer, region or substrate is referred to as being "on" or "over" "atop" "above" "beneath" "below" and so forth with respect to another element, it can be directly on the other element or intervening elements can also be present. In contrast, only if and when an element is referred to as being "directly on" or "directly over" another element, are there no intervening element(s) present. Note that orientation is generally relative; e.g., "on" or "over" can be flipped, and if so, can be considered unchanged, even if technically appearing to be under or below/beneath when represented in a flipped orientation. It will also be understood that when an element is referred to as being "connected" or "coupled" to another element, it can be directly connected or coupled to the other element or intervening elements can be present. In contrast, only if and when an element is referred to as being "directly connected" or "directly coupled" to another element, are there no intervening element(s) present.

The following detailed description is merely illustrative and is not intended to limit embodiments and/or application or uses of embodiments. Furthermore, there is no intention to be bound by any expressed or implied information presented in the preceding sections, or in the Detailed Description section.

One or more example embodiments are now described with reference to the drawings, in which example components, graphs and/or operations are shown, and in which like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details, and that the subject disclosure may be embodied in many different forms and should not be construed as limited to the examples set forth herein.

FIG. 1A is a block diagram representation of one example implementation of a system 100 in which a wearable device 102, which includes a metasurface of unit cells 104, communicates with a computing device 106. In the example of FIG. 1A, the computing device 106 includes an embedded, integrated or otherwise internal transceiver 108, which in turn includes a transmitter 110 and receiver 112. The transceiver components are coupled to an antenna 114 that transmits signals to the metasurface 104 of the passive wearable device 102, which as described herein, alters a reflected instance of the signal's characteristics to the transceiver's receiver 112. Based on the received signal, wearable device-related logic 116 (e.g., a hardware or software program running in the computing device 106) can analyze the reflected signal and take some action based thereon as described herein, such as to wake the operating system program or the like for execution in the computing device. A data store or the like that maintains distinct identifier(s) of valid metasurface(s) by which access to this computing device 106 is allowed can be part of the wearable device-related logic 116, although a separate data store accessible by the wearable device-related logic 116 can be maintained if a large number of such IDs are maintained for a device, such as a shared workstation.

Figure 1B:
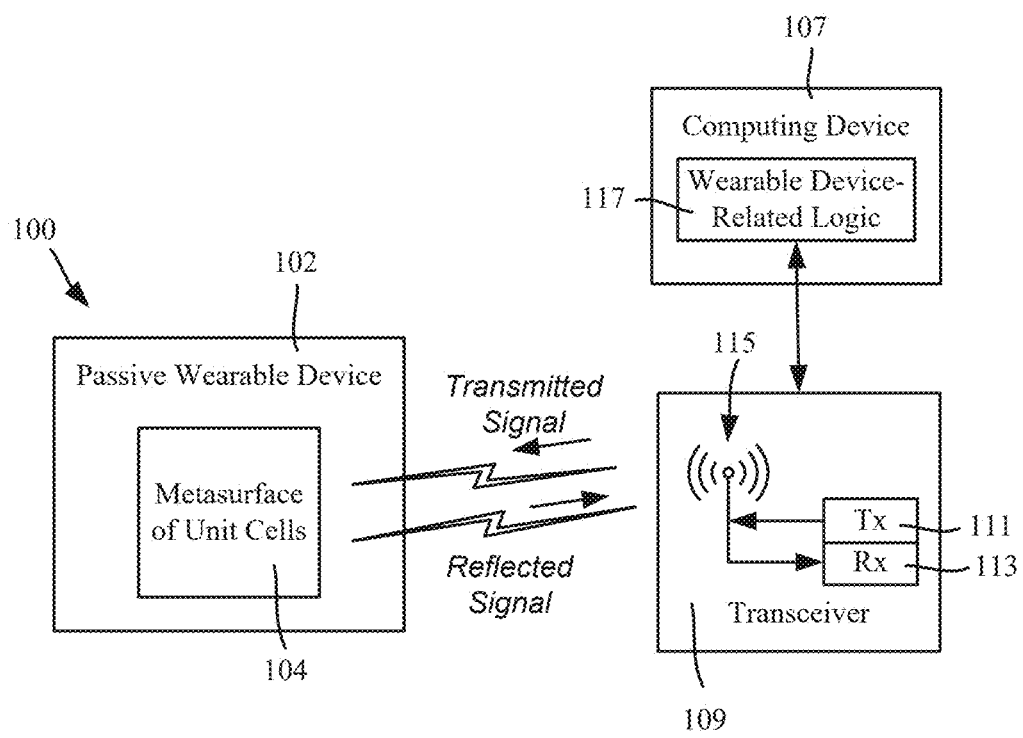
FIG. 1B is a block diagram representation of an example wearable device including a passive metasurface communicating with a computing device via an external transceiver, in accordance with various example embodiments and implementations of the subject disclosure.

FIG. 1B is similar to FIG. 1A, except that a transceiver 109 (transmitter Tx 111/receiver Rx 113) is external to the computing device 107. For example, the external transceiver 109 can be designed as a universal serial bus (USB) device or other suitable device that plugs into a port of the computing device 109. Alternatively, the external transceiver 109 can be embedded in a computer peripheral device such as a mouse, keyboard or monitor coupled to the computing device 107.

While a dedicated transceiver is one practical and convenient example, it should be noted that the transmitter and the receiver can be separate components. For example, consider an office setting where a single wall-mounted transmitter can transmit signals to multiple user work locations. Each user can share the same transmitter, yet have his or her own passive wearable device that reflects from the transmitter to a receiver. The users' respective computing devices can have respective external or internal receivers.

Figure 2:
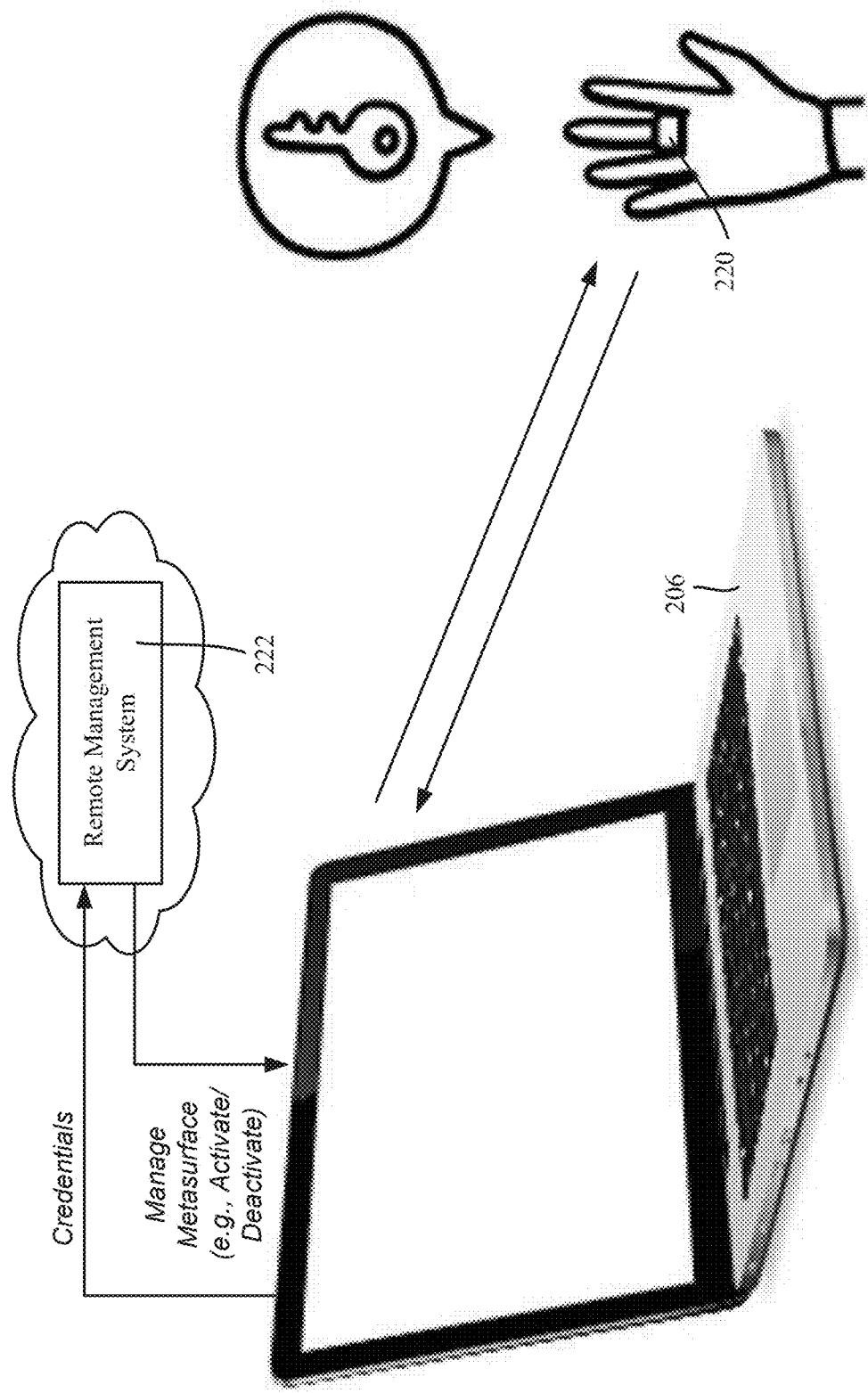
FIG. 2 is a representation of an example wearable device in the form of a ring design, in which the wearable device includes a passive metasurface that acts as a security/authentication key with respect to a computing device, in accordance with various example embodiments and implementations of the subject disclosure.
Figure 3:
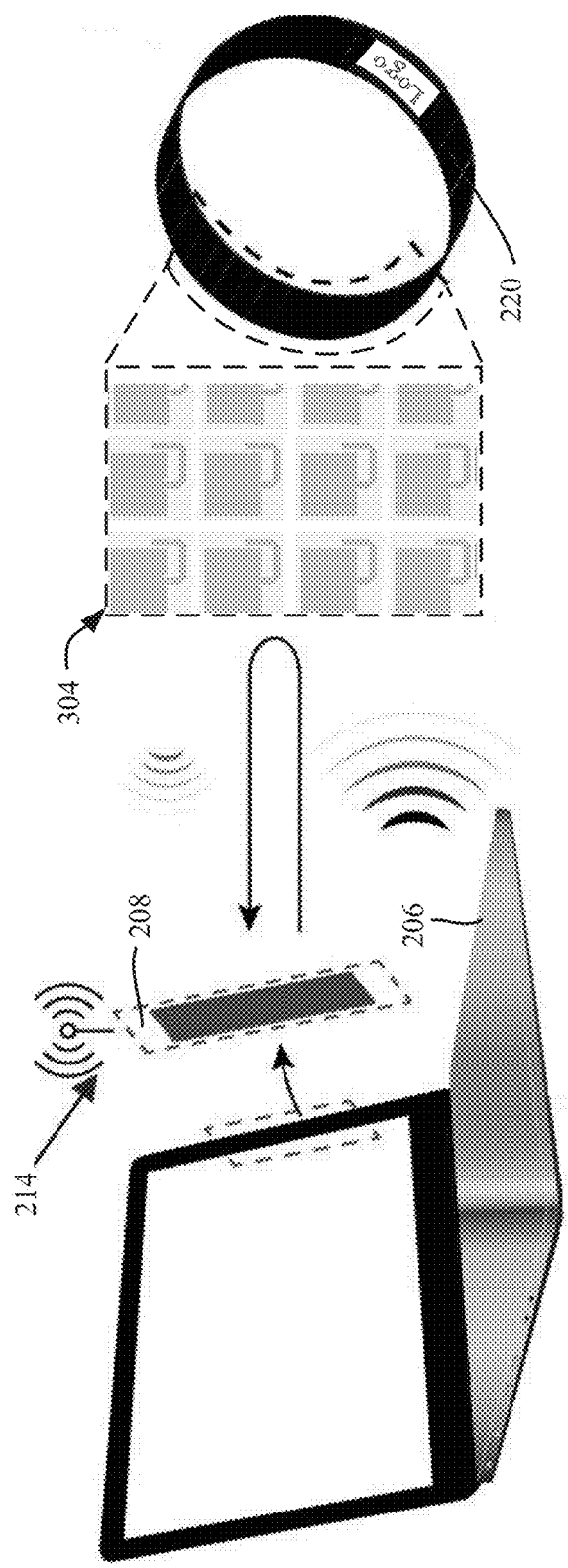
FIG. 3 is a representation of an example wearable device in the form of a ring design, highlighting the passive metasurface communicating with a transceiver embedded in a computing device, in accordance with various example embodiments and implementations of the subject disclosure.

FIGS. 2 and 3 show the general concept of a ring-based wearable metasurface 220 interacting with a laptop computer 206. The ring-based wearable metasurface 220 can act as a key to lock and unlock the computer 206, for example, or at least detect the user's presence to wake the computer 206, such as to automatically open present an interactive lock screen when proximity is detected.

Initially, the ring-based wearable metasurface 220 may need to be initially activated or reactivated with respect to the particular device 206, and/or an account, such as an account that is accessed via the device 206. To this end, a user or administrator sends credentials to a remote management system 222 that ensures that the metasurface 220 has not previously been permanently deactivated, and if not, informs the device 206 (or an account) that the metasurface 220 is now active for interacting with the device. Note that once activated, the remote management system need not be accessed further with respect to the particular device 206, as the signals reflected by the metasurface 220 now have a distinctly recognizable signature that allows access to the device. The distinct radiation pattern (signature/service tag) of the ring-based wearable metasurface 220 thus serves as an access key.

The remote management system maintains an association between the metasurface signature (e.g., service tag) and the credentials. In the event that the metasurface 220 is misplaced, lost or otherwise needs to be disabled (e.g., a former employee has a company-owned ring), the metasurface 220 can be deactivated through the maintained credentials. Deactivation can be permanent, or can be temporary, e.g., the metasurface 220 can be suspended with respect to the device 206/account, and reactivated via the credentials if found or transferred to another user or another device. Information about the device 206 also can be maintained by the remote management system 222. For example, the remote management system 222 can maintain statistics or other data as to metasurface-to-device access patterns, usage, and so forth, e.g., for analysis by the metasurface's owner.

In the example of FIG. 3, a portion of the metasurface unit cells 304 is shown enlarged and interacting with a transceiver 208 (via antenna 214) integrated into the bezel or the like of the computer 206. In general, the user only needs to orient his or her hand at a reasonably close and suitable reflecting angle for the system to operate. Instead of the bezel, the transceiver 208 (or the antenna 214 coupled thereto) can be embedded into the lower portion of the laptop so that when interacting with the keyboard/mouse pad, the user's ring is naturally angled downward in a direction generally towards the antenna.

Figure 4:
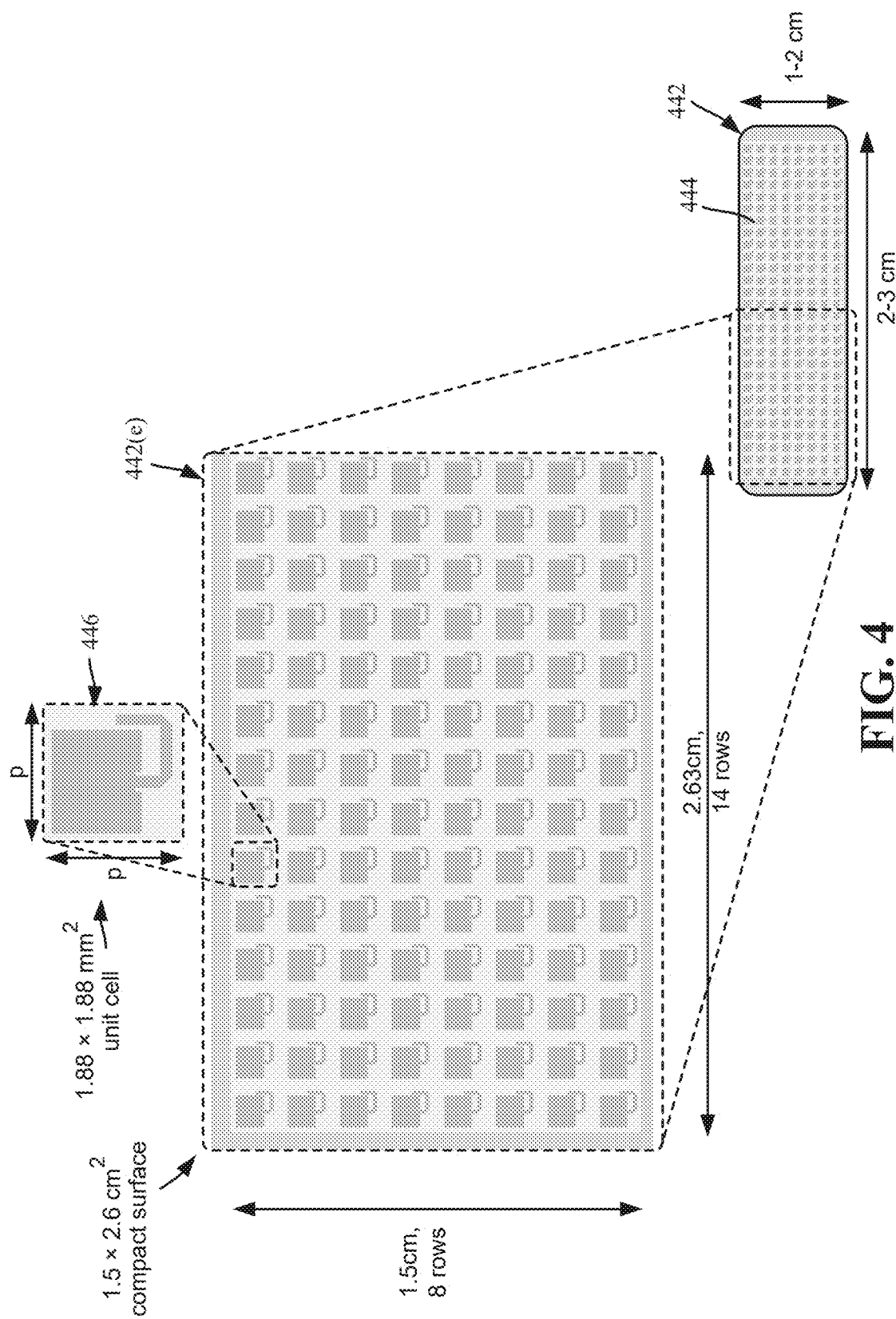
FIG. 4 is a representation of an example surface designed for being implemented at 80 GHz, demonstrating the metasurface's compact and planar features, along with an enlarged portion representation thereof, and an enlarged unit cell representation, in accordance with various example embodiments and implementations of the subject disclosure.

FIG. 4 shows an example wearable device 442 that incorporates a metasurface 444 with an 8×28 array of unit cells. An enlarged portion 442 (e) highlighting an 8×14 unit cell array of the metasurface 444 is shown, and one of the unit cells 446 is enlarged.

In one example implementation, the metasurface is fabricated on flexible material (substrate and metallic ground plane) to facilitate forming the wearable device into a ring shape suitable for wearing on a human finger. The dimensions shown in FIG. 4 are based on a typical adult finger size and a frequency of 80 gigahertz (GHz). The fabrication tolerance of the metasurface design described herein makes this design easily scalable up to sub-terahertz frequencies, which is suitable for miniaturization to fit on a ring. As shown in FIG. 4, each unit cell in this example measures 1.88 mm×1.88 mm. These unit cells can be arranged in a matrix to fit within a ring that measures 1.5 cm in width and 2 to 3 cm in length when flattened. Additionally, the design is conformal, allowing for adjustments to accommodate bending of the surface, ensuring both flexibility and functionality in wearable applications.

Figure 5:
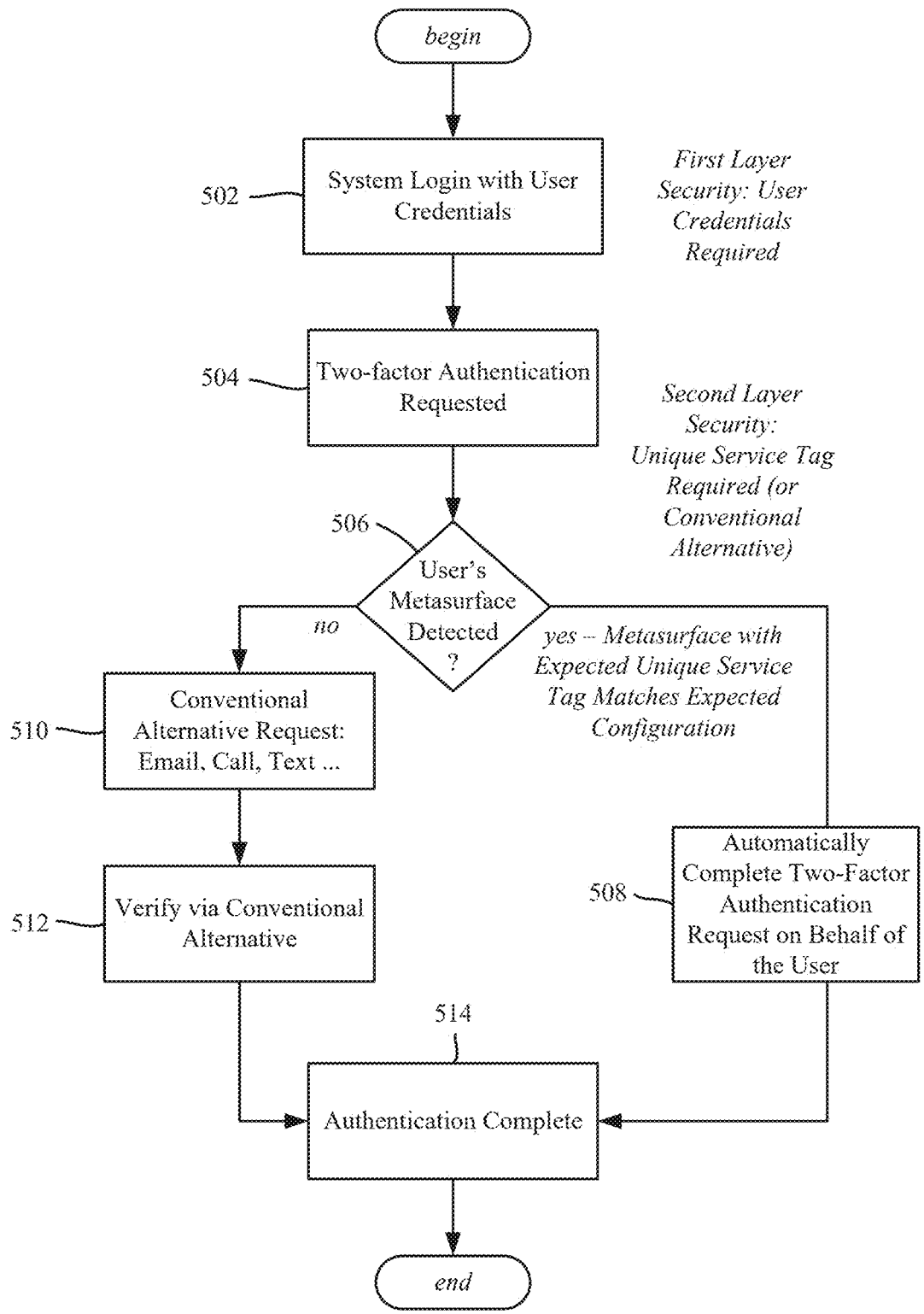
FIG. 5 is a flow diagram showing example operations related to automating two-factor authentication when a metasurface is detected and authenticated, in accordance with various example embodiments and implementations of the subject disclosure.

Turning to multifactor authentication (two-factor authentication in this example), FIG. 5 shows example operations beginning at operation 502 where a user logs into a system (e.g., a system such as a site/website) by entering valid user credentials. This is a first layer of security, as a login request with invalid credentials will be denied.

Operation 504 represents receiving a two-factor authentication request as a second layer of security required to be satisfied to complete the login. If at operation 506 the user's metasurface is detected, that is, the metasurface with a unique ID (service tag) matches the expected ID, the two-factor authentication request is automatically completed on behalf of the user at operation 508, e.g., via local device software coupled to a backend service, and authentication is complete (operation 514). Note that "complete" does not necessarily mean that the user does not still have to submit the code, but rather is intended to mean that the user does not need to take any manual data entry actions (e.g., look at the phone to see the number, then type the number to the input field on the computer) to obtain the two-factor authentication code. For example, the backend service can be an authenticator service, or a service that manages the metasurface coupled to an authenticator service, whereby the local device software receives the two-factor authentication code and populates the code into the input field of the request, which completes the request on behalf of the user. In the event that the completed, auto-populated code is not also submitted by the software, the user can simply hit the enter button or the like with the completed code in the input field to submit the code.

It should be noted that a user in possession of the metasurface can manually enter the service tag, or scan the QR code (FIG. 15A), to verify the user's identity in order to have two-factor authentication automatically handled. This, for example, can be beneficial in a scenario in which the transceiver is not available, e.g., the mouse in which the transceiver is embedded is positioned at an angle in which the metasurface is not being detected, and the user does not realize the issue.

If there is no metasurface detected or manually identified, or a metasurface is detected but the ID thereof does not match the user's expected unique ID, operation 506 instead branches to operations 510 and 512 for conventional two-factor authentication request verification, e.g., email to a registered address associated with the credentials, a telephone call or text to a registered telephone number associated with the credentials, or some other method. Assuming this occurs successfully, authentication is completed as represented by operation 514. Note that operations 510 and 512 are backup operations so that a user can access his or her protected data (e.g., via bank account website, etc.) without the metasurface, although the conventional drawbacks related to needing the secondary manual entry actions remain with the backup technique.

Thus, described herein is using a wearable metasurface that interacts with a transceiver integrated into a computing device or computer peripheral, which automatically verifies the user's identity by reflecting a wireless signal from the metasurface, thereby streamlining authentication without additional user input. This verified identity can be used with two-factor authentication, which is increasingly common across websites and applications, providing a second layer of security beyond traditional passwords; the metasurface identification overcomes the need for further user interaction, such as entering codes from text messages, which can delay the process. The user authentication verifies a user's identity to safeguard against unauthorized access in a way that facilitates improved security without compromising ease of use.

Figure 6:
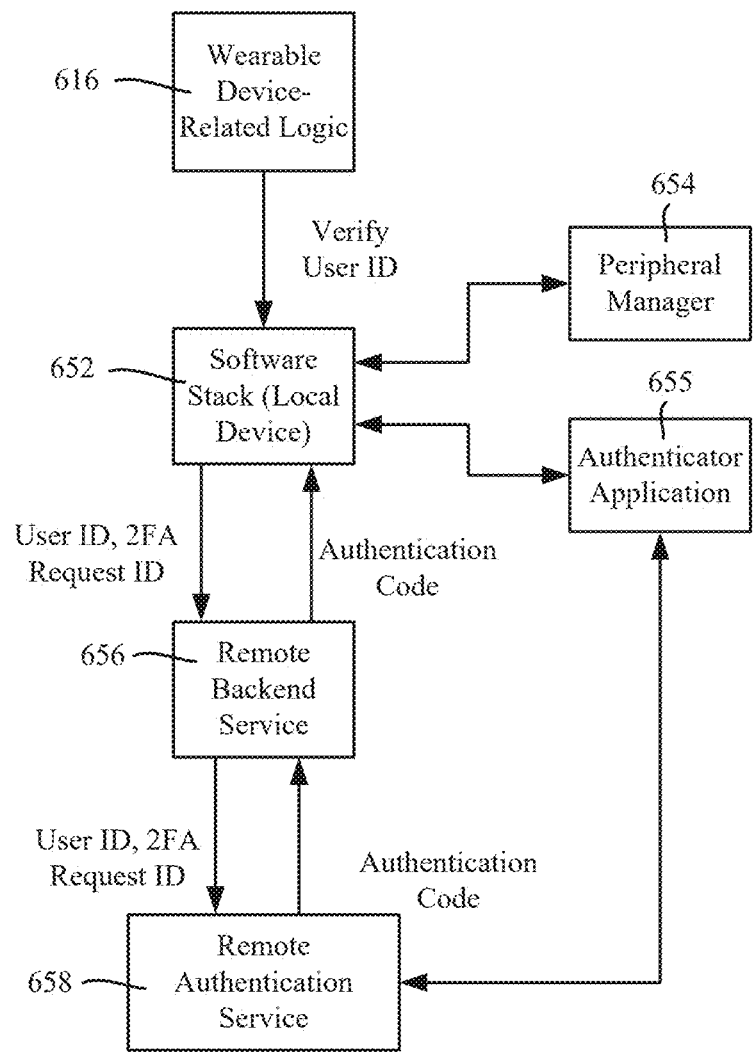
FIG. 6 is a block diagram representation of an example system configured to complete two-factor authentication operations on behalf of a user identity verified via a metasurface, in accordance with various example embodiments and implementations of the subject disclosure.

To this end, as shown in FIG. 6, the wearable device related logic 616 (as described with reference to FIGS. 1A and 1B) verifies the user identity to a local software stack 652. The software stack can include an interface 777 (FIG. 7, with an enlarged portion 777 (e)) with which the user can view information, e.g., related to the metasurface. There is a backend connection from the software stack 652 to a peripheral manager 654 (service, application program or applet), as well as to an authenticator application 655. When a user attempting access to a site or application provides valid credentials and receives a two-factor authentication request (2FA), a remote backend service 656 and/or the authenticator application 655 can communicate with a remote authentication service 658 to obtain the authentication code needed to complete the two-factor authentication request, without the need for an additional device (e.g., text message to phone) or manually typing in the code to the input field where the code is being requested.

Figure 7:
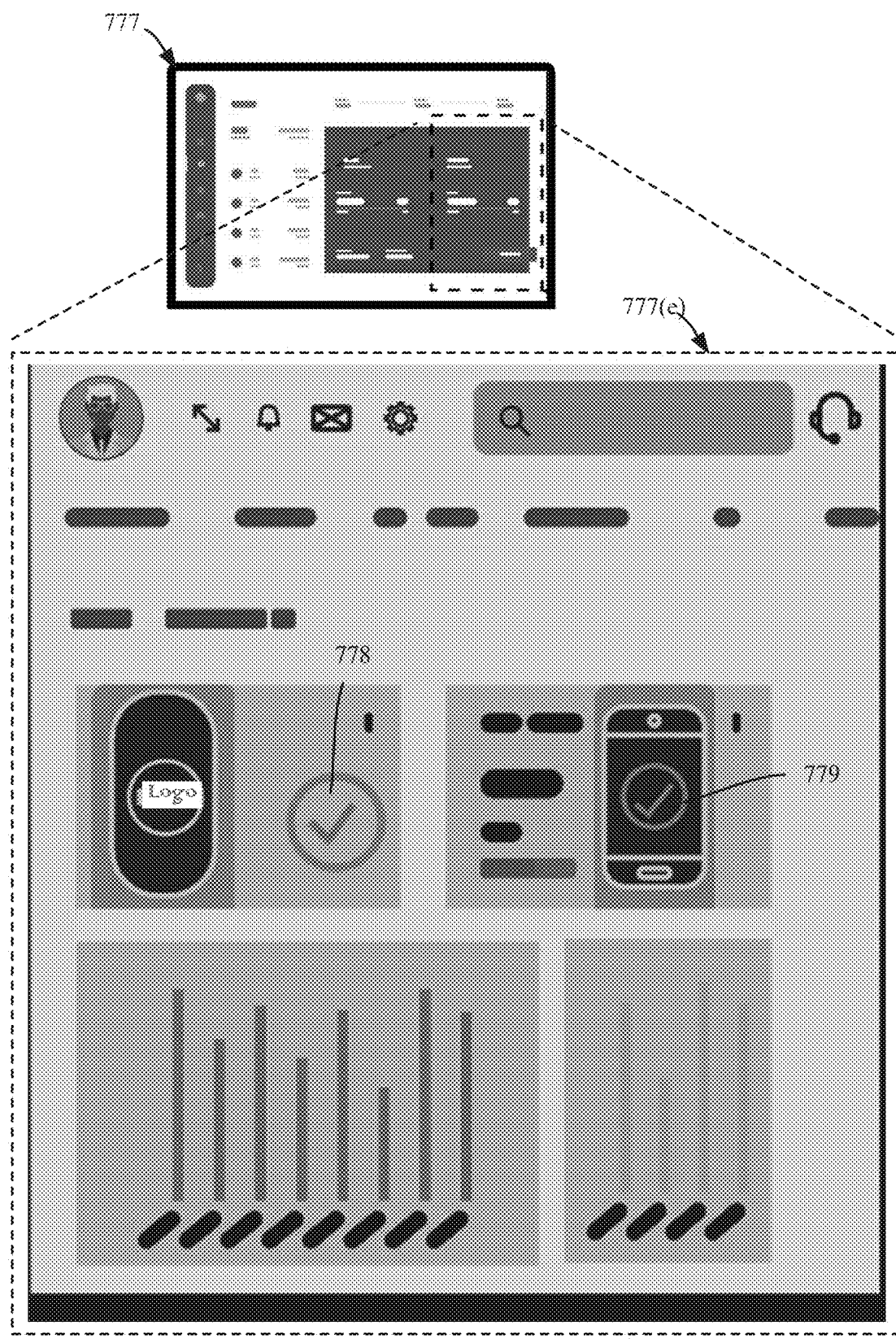
FIG. 7 is a representation of an example software interface with connections to existing local application programs and a remote backend service to an authentication service, in accordance with various example embodiments and implementations of the subject disclosure.

In the example software interface 777 (and enlarged portion 777 (e) thereof) shown in FIG. 7, a user is presented with a comprehensive dashboard, e.g., displaying user profiles, device status, and statistics, e.g., successful and unsuccessful metasurface verification, successful and unsuccessful two-factor authentication completions, and so on. Established connections can also be indicated, e.g., to the peripheral manager program (checkmark icon 778) and to the authenticator program (checkmark icon 779).

Figure 8A:
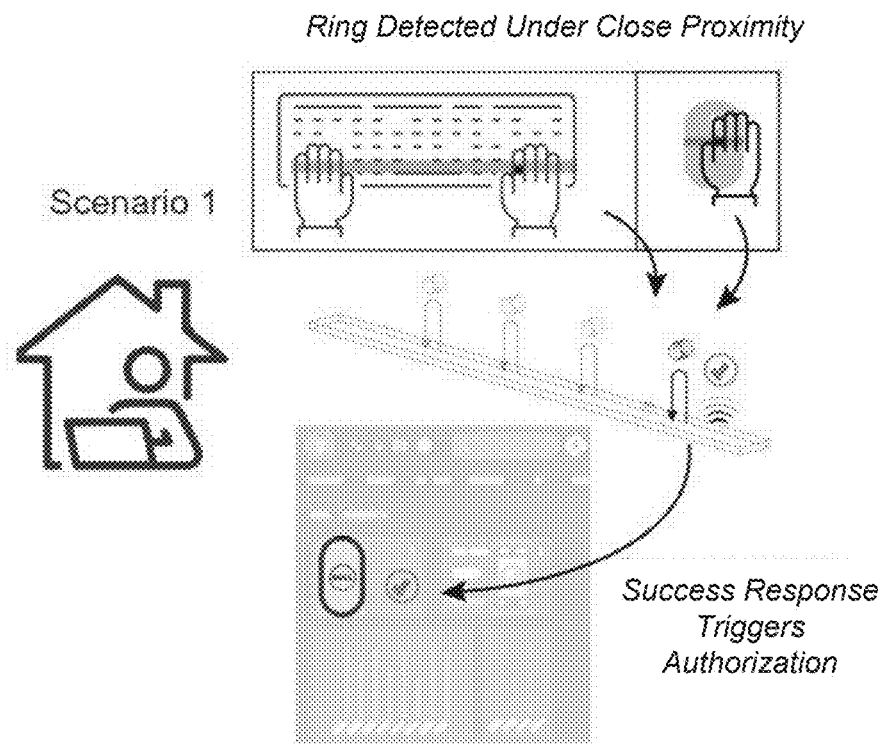
FIGS. 8A and 8B are representations of example scenarios with respect to proximity detection used in two-factor authentication, in accordance with various example embodiments and implementations of the subject disclosure.
Figure 8B:
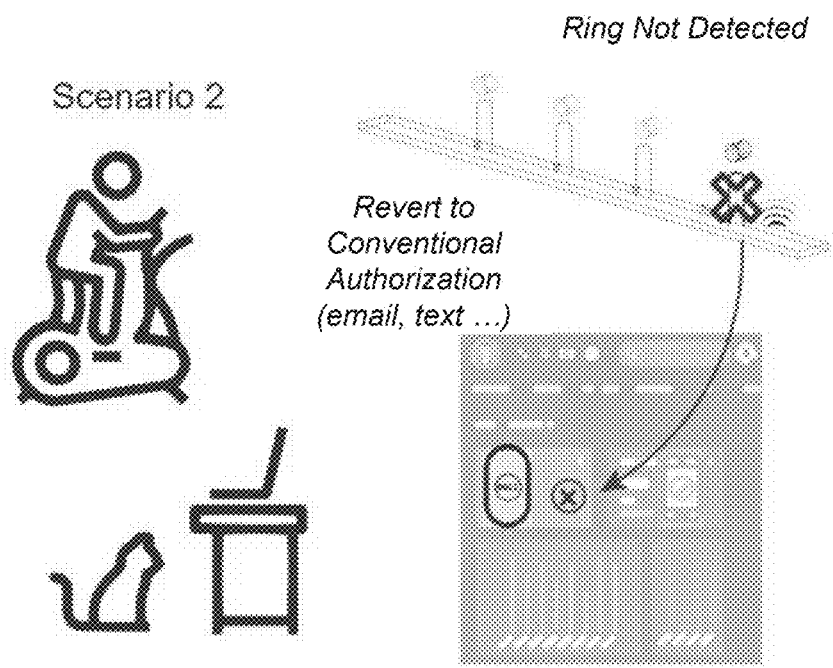

FIGS. 8A and 8B show some example scenarios for proximity detection used with respect to two-factor authentication. In FIG. 8A (scenario 1), the metasurface (e.g., worn on a ring) is detected by the computing device via close proximity. As such, successful identification of the metasurface/user identifies the user and triggers authorization for any two-factor authentication requests. In FIG. 8B (scenario 2), the metasurface is not detected by the computing device, whereby conventional two-factor authentication authorization (e.g., by email, text, or the like is needed).

Note that another consideration is the location of the computing device and/or the type of internet access, which can be determined with respect to entering a standby mode that disables the normal wireless identification mode until user credentials (e.g., a PIN) are received to exit the standby mode and reenable the wireless identification mode. For example, if the metasurface has not been detected for some defined timeframe, the standby mode is entered, necessitating a valid PIN entry to reenable the wireless identification mode. However, if the computing device is currently located at the user's home (or possibly work) location, then the metasurface detection/computing device location are more trusted, and the defined timeframe before entering the standby mode can be relatively long, e.g., on the order of days. Conversely, if the computing device is at a public or other location, and/or the user is using public Wi-Fi, the defined timeframe for entering the standby mode can be relatively short, e.g., on the order of minutes.

Figure 9A:
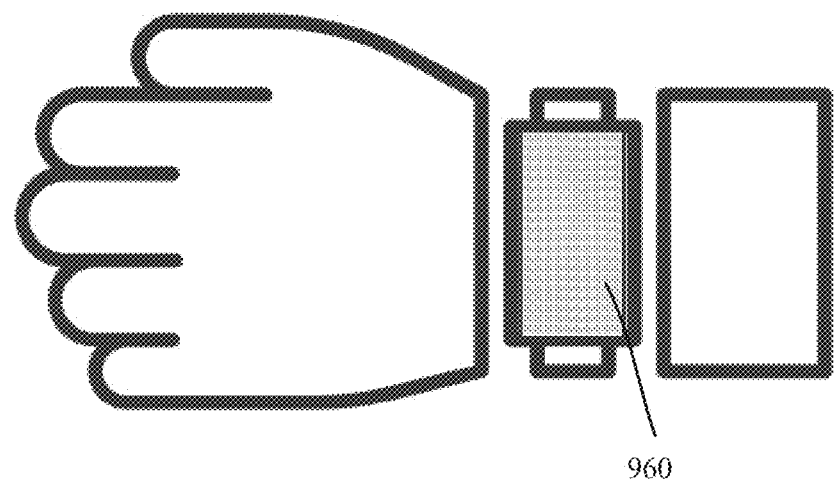
FIG. 9A is a representation of an example wearable device with a passive metasurface in the form of a wrist-wearable (e.g., wristband or bracelet) design, in accordance with various example embodiments and implementations of the subject disclosure.
Figure 9B:
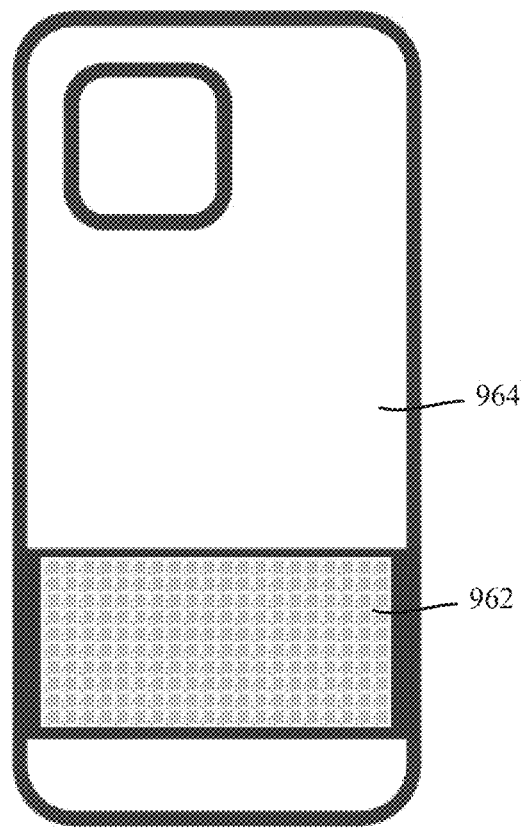
FIG. 9B is a representation of an example passive portable device with a passive metasurface in the form of a design for affixing to a personal item (e.g., cell phone), in accordance with various example embodiments and implementations of the subject disclosure.
Figure 10A:
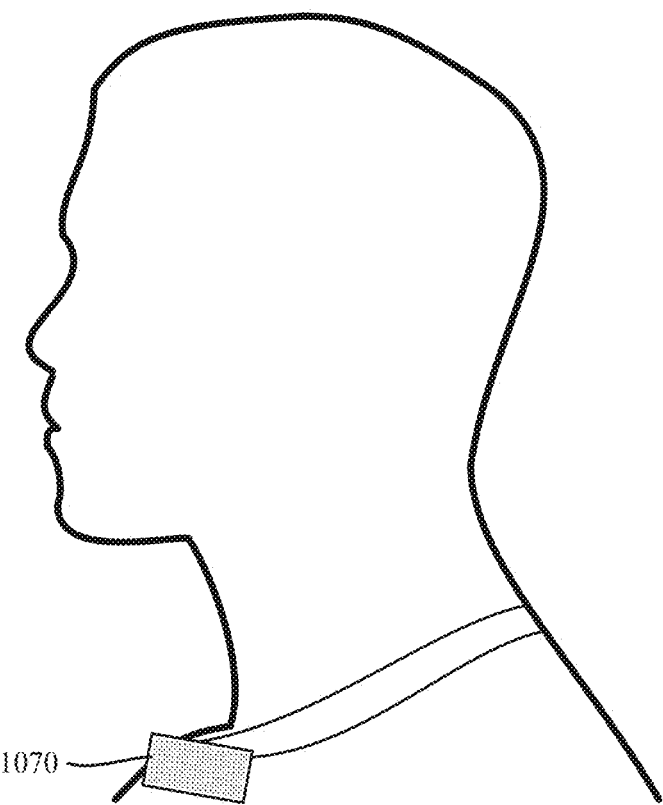
FIG. 10A is a representation of an example wearable device with a passive metasurface in the form of a neck-wearable (e.g., via a lanyard or necklace) design, in accordance with various example embodiments and implementations of the subject disclosure.
Figure 10B:
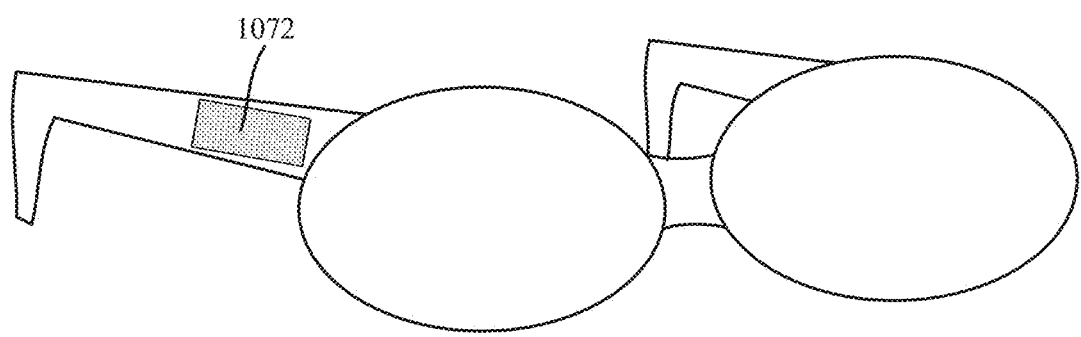
FIG. 10B is a representation of an example portable wearable device with a passive metasurface in the form of a design for affixing to a wearable item (e.g., eyeglass frames), in accordance with various example embodiments and implementations of the subject disclosure.

FIGS. 9A and 9B show alternative, non-limiting examples of wearable devices, namely a wrist-worn (e.g., wristband or bracelet) device 960, and a portable device 962 attached to a cell phone case 964. Although the portable device 962 attached to the cell phone case 964 is not "wearable" in the conventional sense, it can be considered "wearable" to the extent it accompanies a user and is typically part of the user's personal accoutrements that are generally within the user's possession, and indeed, can be "worn" in a user's pocket. FIGS. 10A and 10B show metasurfaces worn around a user's neck (e.g., as a necklace, locket or in lanyard) wearable device 1070, and a wearable device 1072 affixed to a user's eyeglass frame, respectively. Other non-limiting examples that are not explicitly shown include an identification badge, a name tag patch (e.g., affixed at a conference), a headset or headphones (e.g., regularly worn while working with a computer), and so on. Note that while the metasurface itself is passive, the metasurface can be coupled to a non-passive device, e.g., a watchband of a user's existing battery-powered wristwatch. Some example consideration factors when choosing among the wearable metasurface devices are summarized in the following table:

| User Factors | Product |
| --- | --- |
| Tranceiver Alignment | Ring |
| Gain | Wrist-worn Device |
| Convenience | Affixed/Embedded to Phone Case |

Figure 11A:
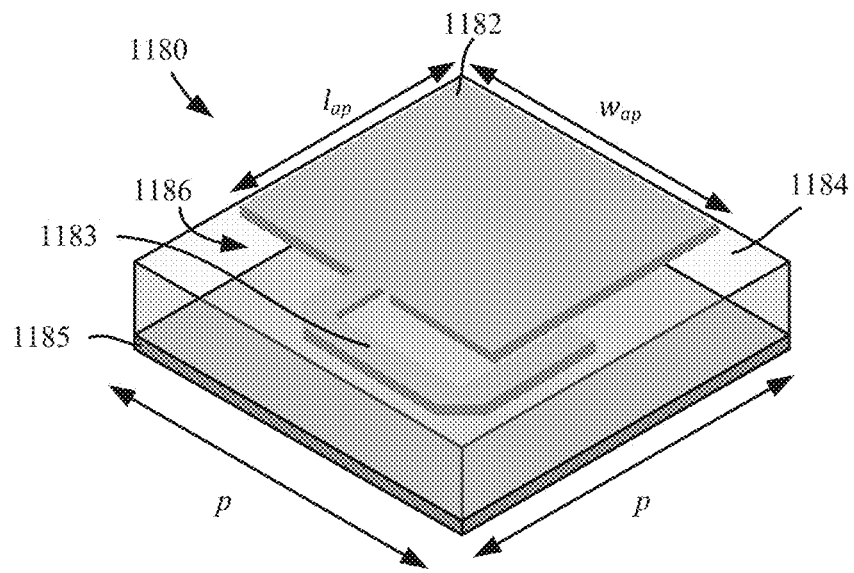
FIG. 11A is a three-dimensional perspective view representation of an example unit cell for a metasurface of a passive wearable device, in accordance with various example embodiments and implementations of the subject disclosure.

FIG. 11A shows a three-dimensional perspective view of one metasurface design 1180 that includes a metallic patch element 1182 and a metallic phase delay element 1183. The metallic patch element 1182 and the metallic phase delay element 1183 are fabricated atop a substrate 1184; a ground plane layer (panel) 1185 beneath the substrate 1184 in conjunction with the metallic patch element 1182 provides an aperture 1186 of length $l_{ap}$ and width $w_{ap}$ that facilitates passive operation of the unit cell 1180. As is understood, an entire array of unit cells can be fabricated on a single substrate/ground plane.

Figure 11B:
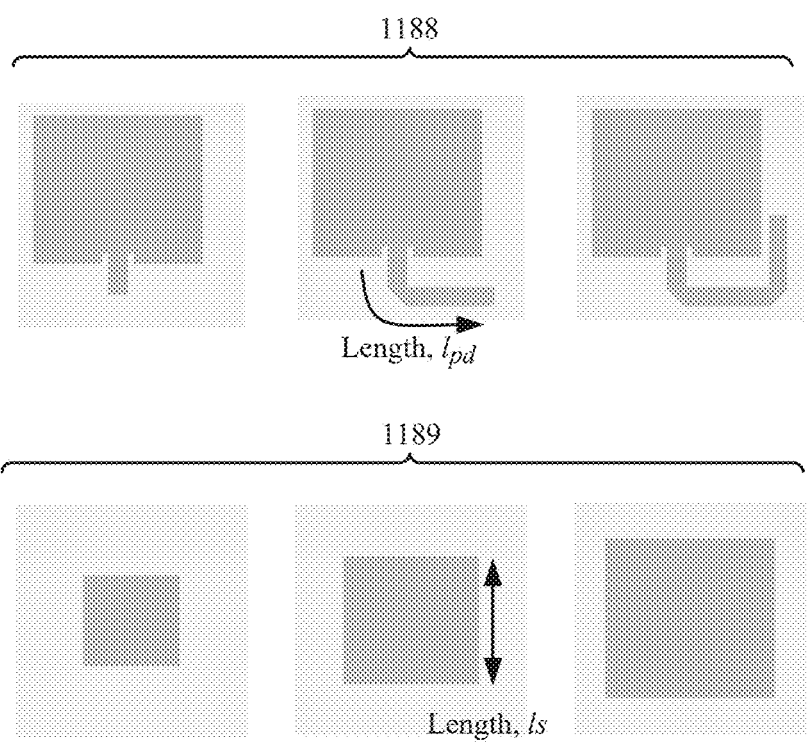
FIG. 11B is a representation of an example unit cell designs with geometry variations for different phase profiles, in accordance with various example embodiments and implementations of the subject disclosure.
Figure 12:
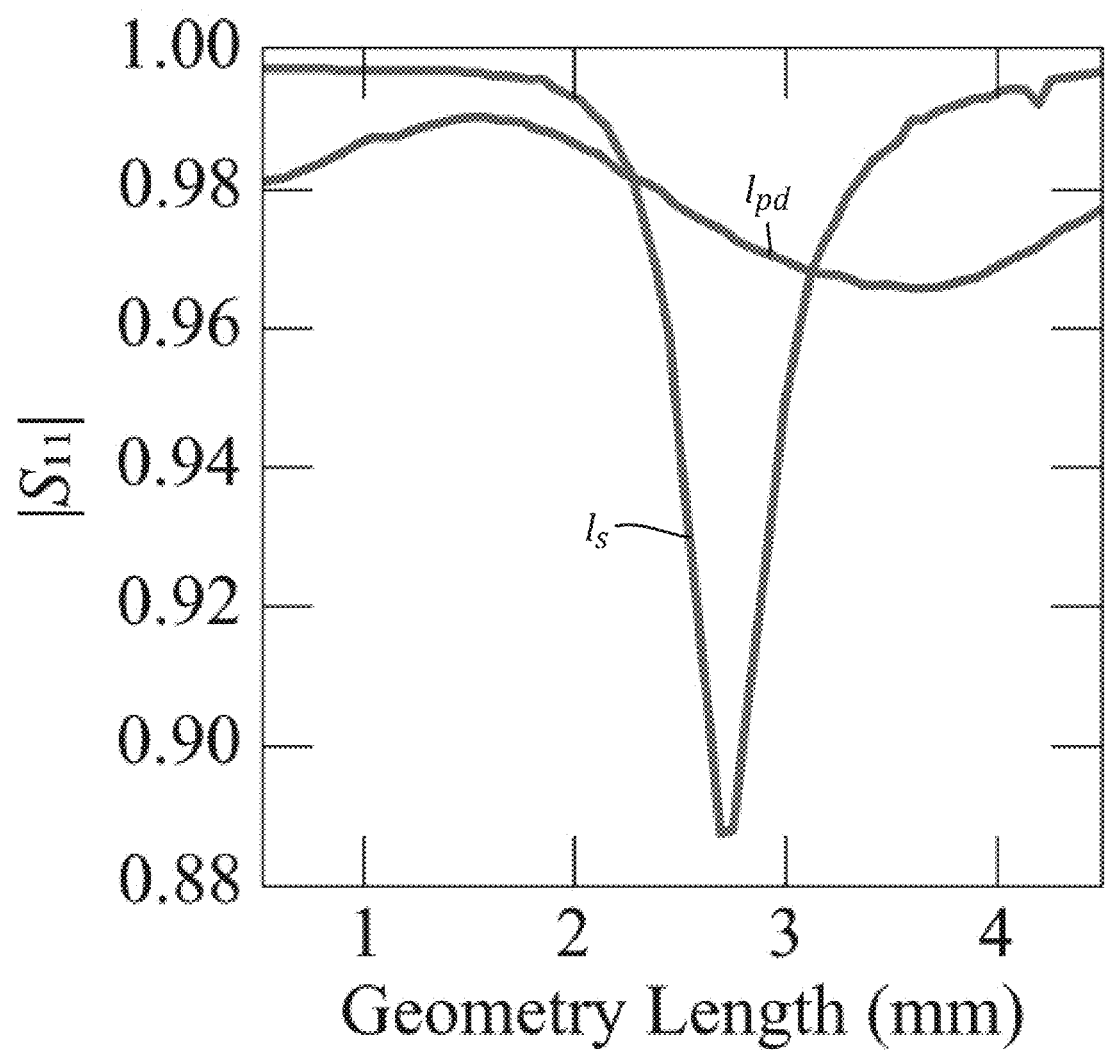
FIG. 12 is a graphical representation of geometry length versus signal reflection for example passive metasurface device designs, in accordance with various example embodiments and implementations of the subject disclosure.
Figure 13:
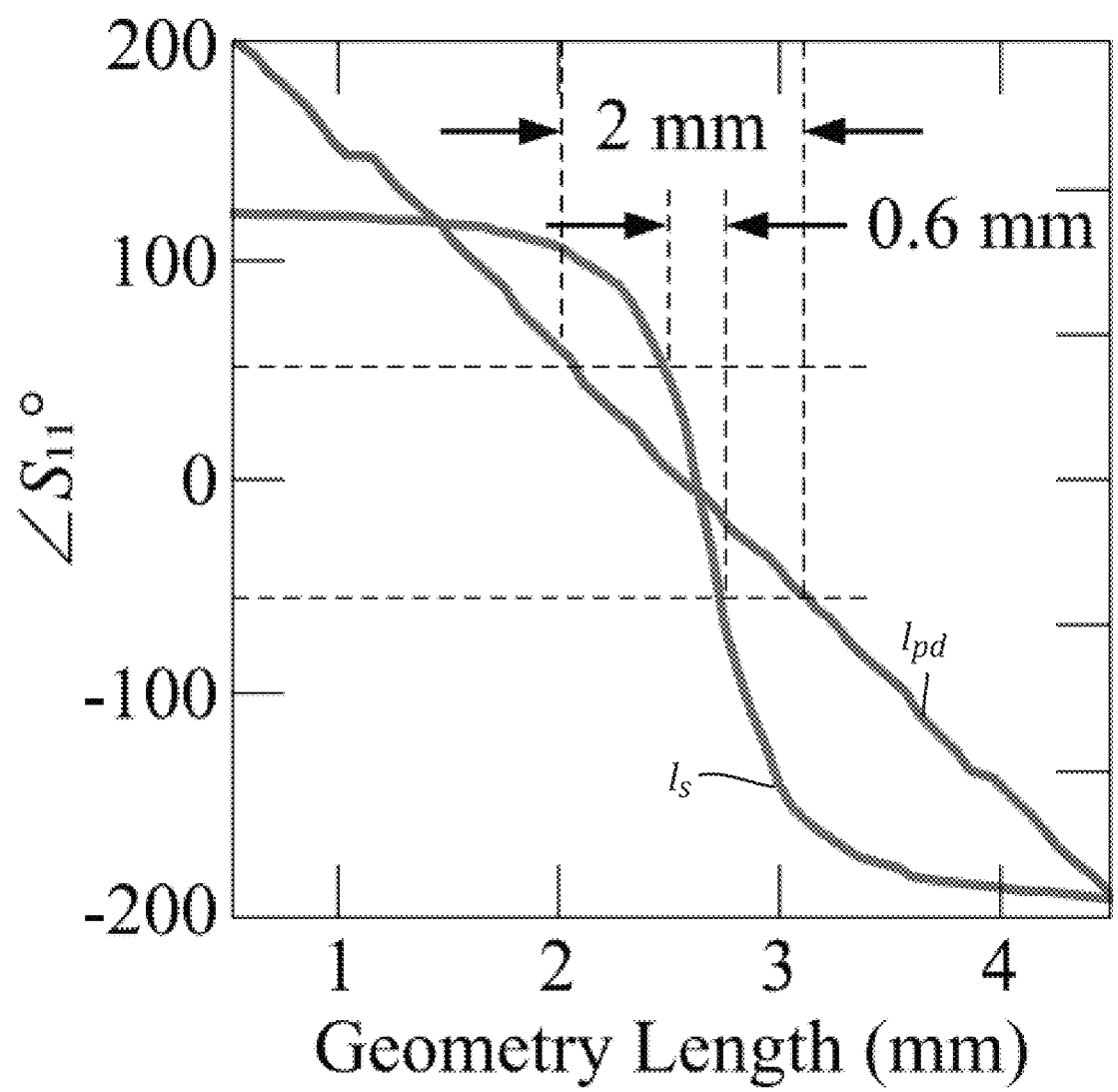
FIG. 13 is a graphical representation of geometry length versus signal reflection angle data for example passive metasurface device designs, in accordance with various example embodiments and implementations of the subject disclosure.

The length of the phase delay element 1183 (i.e., metallic stub) adjusts the phase of the reflected signal. Such a phase delay element-based designs (1188, FIG. 11B) overcome several challenges that regular variable-patch size approaches (1189, FIG. 11B) encounter, as demonstrated by the simulation results shown in FIGS. 12 and 13. The simulation shows a full-wave numerical experiment result for an example unit-cell design using line-delay elements, which demonstrates phase delay element-based phase linearity compared to conventional size variation. The design was originally designed for 30 GHz, with $l_{ap}$=2.93 mm, $w_{ap}$=3.31 mm, and p=5.01 mm More particularly, FIGS. 12 and 13 highlight how the patch size variation approach designs 1189 (without delay lines) suffer from phase errors, due to a combined effect of fabrication tolerance and the rapid phase variation near resonance. As shown in FIG. 13, the phase undergoes a 100 degree change within a mere 0.6 mm range. With typical fabrication tolerances between 0.07 to 0.20 mm (3-8 mil), this design is prone to phase errors, particularly at higher frequencies and/or when using cost-effective, lower precision manufacturing techniques. In contrast, the phase delay element designs 1188 (FIG. 11B) with delay lines exhibit a flatter amplitude profile and a linear phase trend, as also shown in FIGS. 12 and 13, respectively. The phase shift with the phase delay element design approach 1188 is proportional to twice the line length, offering significantly more reliable and consistent performance.

The phase delay element implementation design is appropriate for high frequency operation in that the design reduces the physical size and minimizes interference. More particularly, a metasurface design uses the phase delay element for tuning reflected signals' phase for high frequency operation, which enhances device compactness, aesthetic integration, and reduces interference by avoiding crowded spectral bands. At the same time, the design facilitates straightforward fabrication with the metallic patch element and phase delay element with a conformal design for versatile integration. Designing the length of the phase delay element for tuning not only eases the manufacturing process, but also significantly enhances the fabrication tolerances, which can significantly reduce barriers to innovation and deployment. The metasurface design's conformal nature is beneficial in wearable technology.

A wearable device can have information encoded into its reflected signal based on how the reflected signal is altered by the metasurface relative to the transmitted signal. More particularly, any device can be crafted with a distinct metasurface pattern that distinguishes that metasurface from others. The distinct identifiability of each device is based on its physical radiation characteristics, in that each metasurface can generate a distinct radiation pattern in the reflected signal, which differentiates each such metasurface while ensuring that each metasurface can uniquely interact with the corresponding system.

Figure 14A:
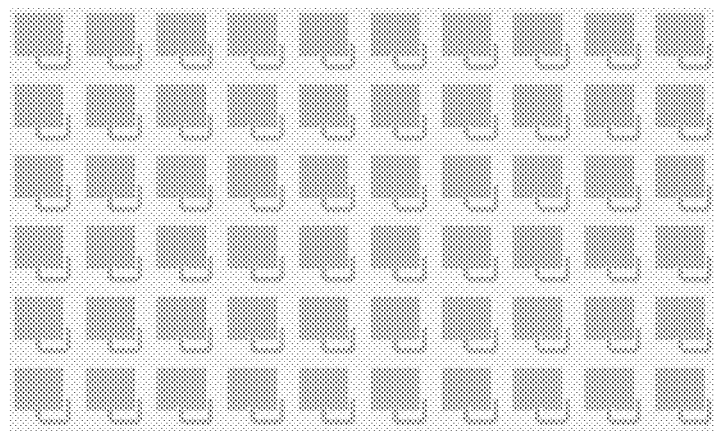
FIGS. 14A-14C are representations of example metasurfaces with various different design parameters to create distinct per device signatures, in accordance with various example embodiments and implementations of the subject disclosure.
Figure 14B:
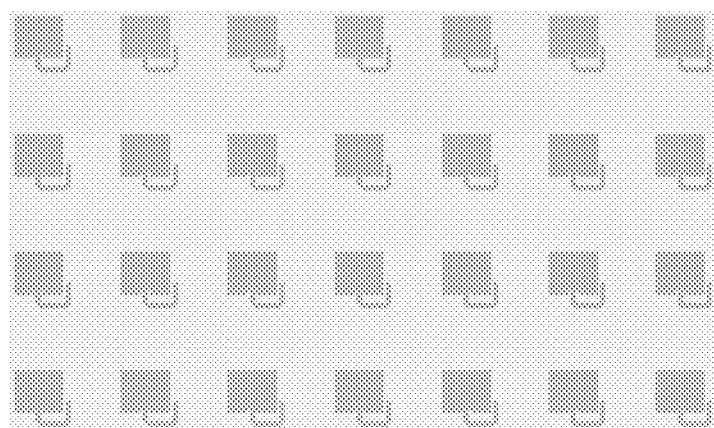
Figure 14C:
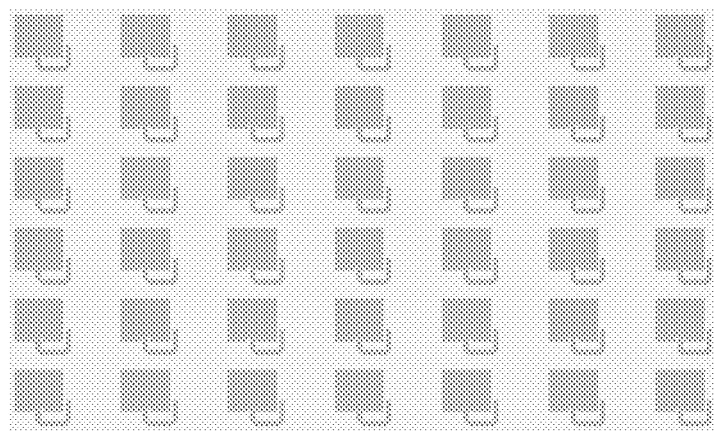

To this end, each device can be manufactured with a system-unique set of metasurface scatters (or simply unit-cells) to provide variations in terms of phase, gain, beam patterns, dual beam splitting, directivity, and the like which can be achieved by altering the unit-cell shape, phase, size, spacing, rotation, among other characteristics, as shown in FIGS. 14A-14C; the characteristics can be unique and randomized/or altered according to a controlled pseudorandom pattern. For example, the example metasurface of FIG. 14A can be considered a standard metasurface, while the more spaced-apart unit cells of FIG. 14B (relative to FIG. 14A) can provide a variation on the beam width. The horizontal spacing and vertical spacing differences in FIG. 14C can result in asymmetric beam splitting based on grating lobes (resulting in variations on the number of reflected beams and their angles).

An advantageous characteristic of the wearable technology described herein is the scalable design of the metasurface, which can be adapted to fit various sizes and types of wearables. The flexibility to customize the size of the metasurface based on the surface area of the wearable item enables a tailored approach to meet specific user requests or needs. Further, as described with refence to FIGS. 14A-14C, there can be a distinct per-device performance signature, possibly globally unique, by which each device is manufactured with a different set of metasurface scatters (i.e., unit-cells) to provide variations in terms of phase, gain, beam patterns, multiple (e.g., dual) beam splitting, directivity and the like, which can be achieved by altering the unit-cell shape, phase, size, spacing, rotation and so forth.

This distinct performance signature can be linked to a system-unique device ID, in which the system expects to detect the predetermined performance signature when the wearable device is linked to the user's computing device and/or associated account. For example, the wearable device-related logic 146 (FIG. 1A) or 147 (FIG. 1B) can look for an expected radiation pattern and match it to a user account; if not matched, or no signal is reflected, metasurface-based access is denied, although another way to access the account may be enabled, such as if the user has forgotten to wear the device. There also can be shared access to a computing device, and thus the logic can map one radiation pattern signature to one authorized user of that computing device and to that user's profile/account, and map a different radiation pattern signature to another authorized user of that computing device and to that other user's profile/account.

Among the benefits of distinct metasurfaces and their corresponding distinct physical radiation patterns is with respect to integrated physics device identification for remote management of wearable metasurfaces. A concern regarding the security of a system as described herein is to ensure that only a specific, authorized wearable device can unlock the system/account, rather than just any wearable device. To address this, each device can be crafted with a different metasurface pattern that distinguishes it from others.

Figure 15A:
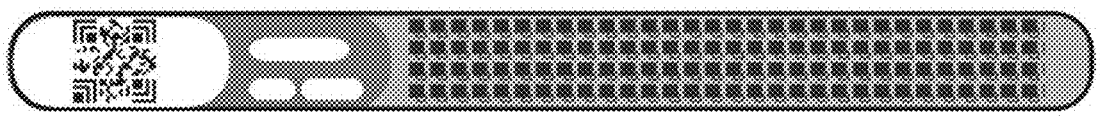
FIG. 15A is a representation of an example wearable device in which a distinct device physical radiation pattern signature is included in a device service tag, in accordance with various example embodiments and implementations of the subject disclosure.

The distinct identifiability via customized radiation characteristics also facilitates the association of a service tag encoding for individual metasurface identification. By way of example, consider that the customized radiation characteristics can encode/correspond to a number of (e.g., seven) alphanumeric characters, that encode the specific differences in each metasurface's design, such as appearance, materials, location, antenna patterns, beam splitting nature, range, and so forth. Individual performance parameters can be encoded as well. An example metasurface with an associated service tag that is also encoded in the customized radiation characteristics is shown in FIG. 15A.

This customization involves distinct radiation patterns generated by each metasurface, tailored specifically to each device ID. This device ID can be incorporated or encrypted within an enterprise's service tag mechanism. For example, because peripherals do not need a separate service tag, a device ID in case of a wearable device is desirable to distinguish the physical features, internal metasurface design patterns, beam patterns, materials, location, and in general for remote management, including activation of the device when purchasing or deactivation in case if the device gets lost.

With respect to improved security and privacy, leveraging the distinct signal manipulation capabilities of metasurfaces, the technology described herein offers an advanced level of security. The complexity and customization potential of the reflected signals make it extremely challenging for unauthorized entities to mimic or hack. Indeed, the different characteristics of each ring or wearable device, achieved through specific customization of the radiation characteristics, can include the beam width (angular scan range) and the asymmetric beam splitting, which varies according to the number of beams and their specific angles. This ensures that each ring interacts individually with the system, providing a secure and personalized method of access.

Figure 15B:
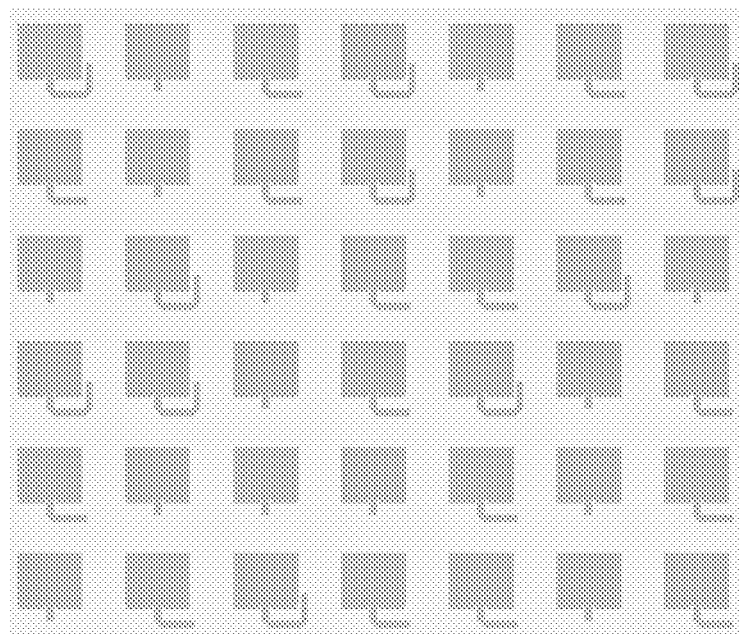
FIG. 15B is a representation of example unit cell designs with different length delay lines (stubs) arrayed for a distinct phase profile, in accordance with various example embodiments and implementations of the subject disclosure.
Figure 15C:
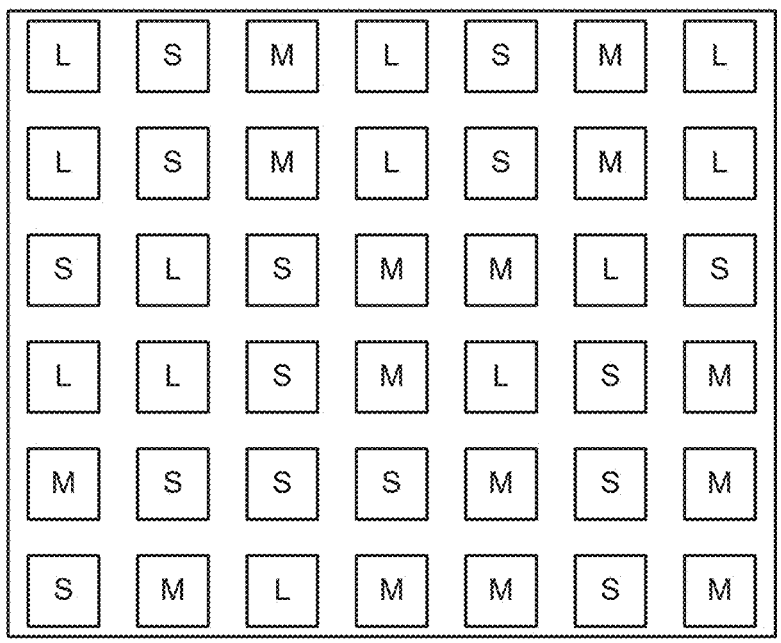
FIG. 15C is a representation of a map of the example unit cell designs with different length delay lines of FIG. 15A, in accordance with various example embodiments and implementations of the subject disclosure.

As a further example, in addition to the spacing differences described with reference to FIGS. 14A-14C, consider the different patterns of unit cell delay line (stub) lengths shown in FIG. 15B. FIG. 15C shows a map of the lengths, e.g., S (short), M (medium) and L (long) which can be distinctly arranged per metasurface. The pattern of the length arrangements of FIG. 15B, which results in one particular phase profile, can be varied for another device, and so on, providing another variable characteristic that modifies the physical radiation pattern of the reflected signal relative to the transmitted signal. Note that while three different delay line lengths are depicted, there can be more than three different lengths, providing even more variations in phase profiles among metasurfaces.

Figure 16:
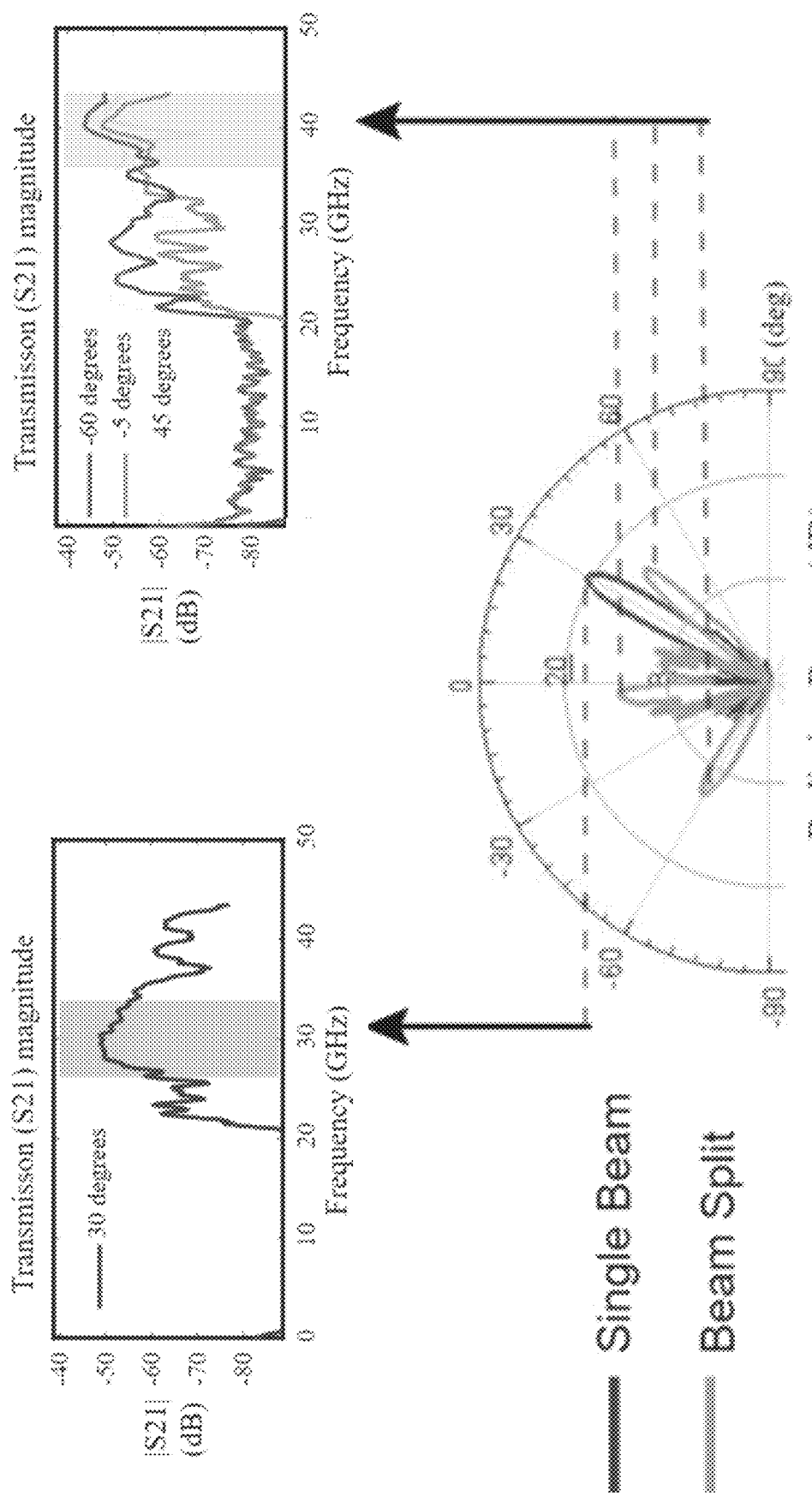
FIG. 16 is a graphical representation of different radiation patterns achieved from an example grating lobe-based beam-splitting metasurface, demonstrating the capability for a single reflected beam or a split beam from a wearable device with a passive metasurface, in accordance with various example embodiments and implementations of the subject disclosure.

FIG. 16 shows a different radiation pattern achieved from a metasurface configured for beam splitting. The frequency is tunable based on the metasurface unit cell size.

Figure 17:
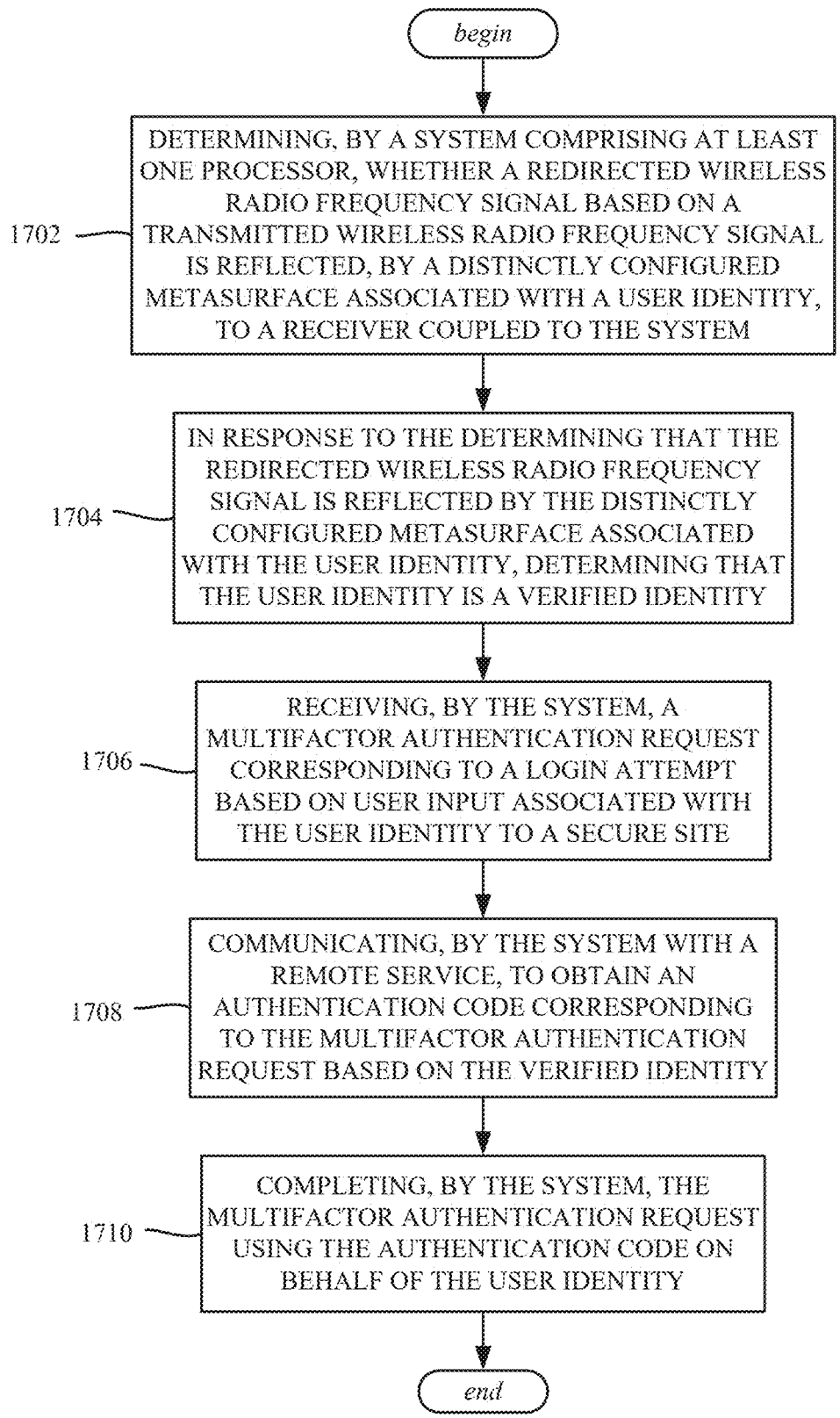
FIG. 17 is a flow diagram showing example operations related to communicating, with a remote service to obtain an authentication code corresponding to a multifactor authentication request based on a verified identity for completing the multifactor authentication request using the authentication code, in accordance with various example embodiments and implementations of the subject disclosure.

One or more example implementations and embodiments, such as corresponding to example operations of a method, are represented in FIG. 17. Example operation 1702 represents determining, by a system comprising at least one processor, whether a redirected wireless radio frequency signal based on a transmitted wireless radio frequency signal is reflected, by a distinctly configured metasurface associated with a user identity, to a receiver coupled to the system. Example operation 1704 represents in response to the determining that the redirected wireless radio frequency signal is reflected by the distinctly configured metasurface associated with the user identity, determining that the user identity is a verified identity. Example operation 1706 represents receiving, by the system, a multifactor authentication request corresponding to a login attempt based on user input associated with the user identity to a secure site. Example operation 1708 represents communicating, by the system with a remote service, to obtain an authentication code corresponding to the multifactor authentication request based on the verified identity. Example operation 1710 represents completing, by the system, the multifactor authentication request using the authentication code on behalf of the user identity.

Completing the multifactor authentication request can include completing an authentication code input field on an interface via which a representation of the multifactor authentication request is presented via a device associated with the user identity.

Communicating with the remote service can include communicating with the remote service via at least one of: a local authenticator application, or a remote backend service.

Further operations can include presenting, by the system, at least one of: analytics information related to metasurface interaction with the system, or analytics information related to multifactor authentication based on metasurface interaction with the system.

Further operations can include presenting, by the system, a visible indication that the remote service is connected to an authentication service.

Further operations can include, in response to determining that the redirected wireless radio frequency signal is not reflected by the unit cells of the distinctly configured metasurface, facilitating, by the system, manual completing of the multifactor authentication request on behalf of the user identity.

Determining whether the redirected wireless radio frequency signal based on the transmitted wireless radio frequency signal is reflected by the distinctly configured metasurface associated with the user identity can correspond to a wireless identification mode, and further operations can include, in response to determining that the redirected wireless radio frequency signal has not been reflected by the distinctly configured metasurface for a defined period of time, entering, by the system, a standby mode that disables the wireless identification mode until user credentials are received to exit the standby mode and reenable the wireless identification mode.

Further operations can include, determining, by the system, a location of the transceiver, and setting, by the system, the defined period of time based on the location.

One or more implementations and embodiments can be embodied in a system, such as described and represented herein. The system can include a distinctly configured metasurface, associated with a user identity, that reflects an altered instance of an incoming transmitted signal to a transceiver coupled to a computing device; the altered instance can include a distinct radiation pattern that verifies the user identity. The system further can include multifactor authentication logic, executing on the computing device, that detects a multifactor authentication request corresponding to a user login attempt to access a site via the computing device. An authentication service can be communicatively coupled to the multifactor authentication logic, and the multifactor authentication logic can communicate information corresponding to the user identity and the multifactor authentication request to the authentication service, and obtain a multifactor authentication code from the authentication service. The multifactor authentication logic can populate an input field, associated with the multifactor authentication request, with the multifactor authentication code.

The multifactor authentication can be a two-factor authentication request.

The distinctly configured metasurface can alter the altered instance of the incoming transmitted signal with a distinct radiation pattern, corresponding to a service tag of the metasurface, that verifies the user identity to the multifactor authentication logic.

The multifactor authentication logic can include software code that presents analytics information related to metasurface interaction with the multifactor authentication logic.

The multifactor authentication logic can present a visible representation indicating that the multifactor authentication logic is communicatively coupled to the authentication service.

The multifactor authentication logic can present a visible activation status representation indicating that the distinctly configured metasurface has verified the user identity to the multifactor authentication logic.

The multifactor authentication logic can be coupled to peripheral manager software code executing on the computing device, or an applet executing on the computing device.

Figure 18:
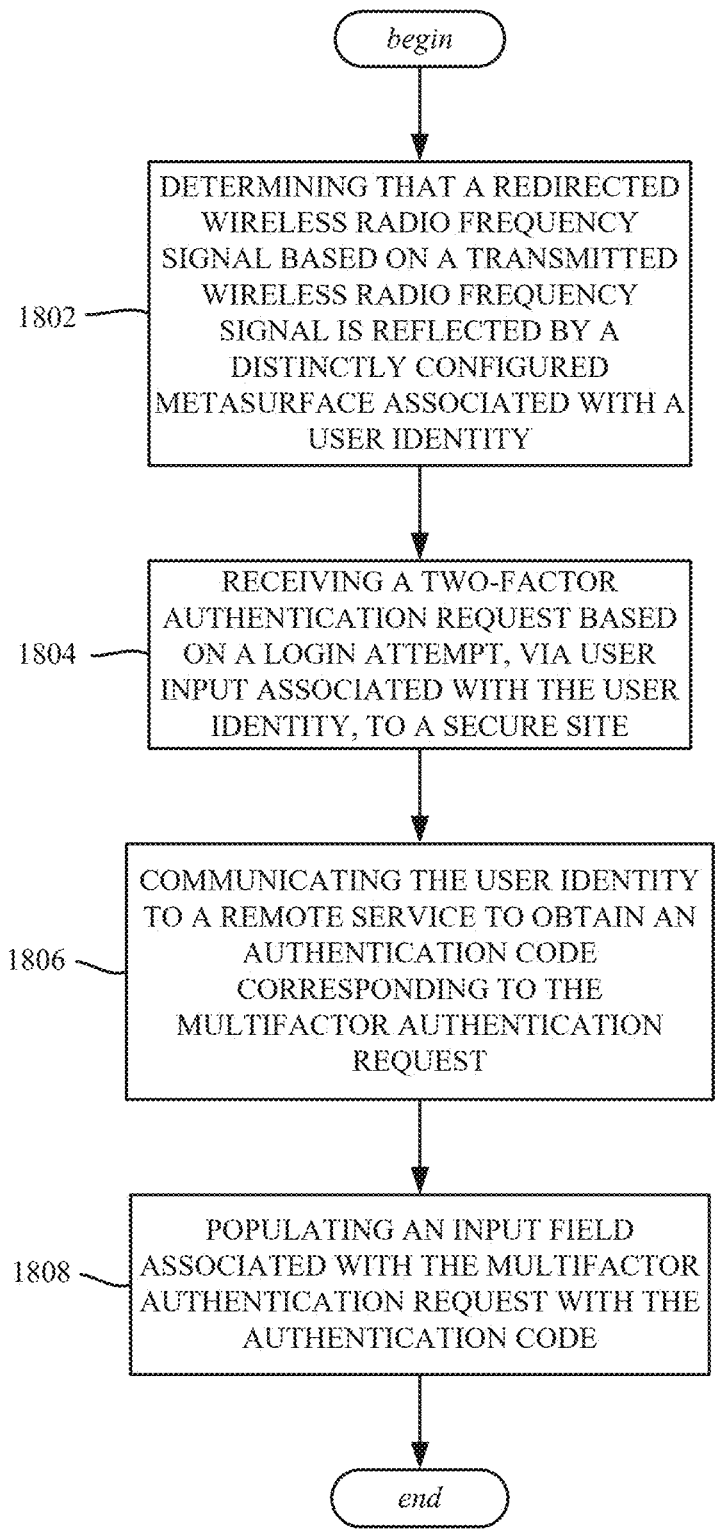
FIG. 18 is a flow diagram showing example operations related to communicating a user identity to a remote service to obtain an authentication code corresponding to a multifactor authentication request, in accordance with various example embodiments and implementations of the subject disclosure.

FIG. 18 summarizes various example operations, e.g., corresponding to a machine-readable medium, including executable instructions that, when executed by at least one processor, that, when executed by at least one processor, facilitate performance of operations. Example operation 1802 represents determining that a redirected wireless radio frequency signal based on a transmitted wireless radio frequency signal is reflected by a distinctly configured metasurface associated with a user identity. Example operation 1804 represents receiving a two-factor authentication request based on a login attempt, via user input associated with the user identity, to a secure site. Example operation 1806 represents communicating the user identity to a remote service to obtain an authentication code corresponding to the multifactor authentication request. Example operation 1808 represents populating an input field associated with the multifactor authentication request with the authentication code.

Determining that the redirected wireless radio frequency signal based on the transmitted wireless radio frequency signal is reflected by the distinctly configured metasurface can correspond to a wireless identification mode, and further operations can include, in response to determining that the redirected wireless radio frequency signal based on the transmitted wireless radio frequency signal has not been reflected by the distinctly configured metasurface for a defined period of time, changing from the wireless identification mode to a standby mode that disables the wireless identification mode, receiving user credentials while in the standby mode, and in response to verifying the credentials as valid, reenabling the wireless identification mode from the standby mode.

Further operations can include determining location data of a receiver that receives the redirected wireless radio frequency signal, and setting the defined period of time based on the location data.

Further operations can include determining that a connection to the remote service is via a public Wi-Fi connection, and setting the defined period of time based on the public Wi-Fi connection.

Further operations can include presenting via a display device, at least one of: analytics information related to the distinctly configured metasurface, a visible representation based on a connection to the remote service, or a visible representation indicating that the user identity is verified for the two-factor authentication request.

As can be seen, the technology described herein is directed towards multifactor authentication based on a user's wearable/portable device, facilitating seamless authentication on digital computing devices such as a laptop/desktop PC. A software stack and backend service can complete the multifactor authentication on behalf of a verified user. Identification to verify the user is implemented through a passive metasurface, which enhances personal security and facilitate seamless interaction with digital environments. Metasurfaces, being engineered interfaces, manipulate electromagnetic waves in ways that traditional materials cannot, without requiring any power source, making them very suitable for passive operations in wearable technology, as well as facilitating distinct radiation patterns per metasurface.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As used in this application, the terms "component," "system," "platform," "layer," "selector," "interface," and the like are intended to refer to a computer-related resource or an entity related to an operational apparatus with one or more specific functionalities, wherein the entity can be either hardware, a combination of hardware and software, software, or software in execution. As an example, a component can be an apparatus with specific functionality provided by mechanical parts operated by electric or electronic circuitry.

As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A method, comprising:
   determining, by a system comprising at least one processor, whether a redirected wireless radio frequency signal based on a transmitted wireless radio frequency signal is reflected, by a distinctly configured metasurface associated with a user identity, to a receiver coupled to the system;
   in response to the determining that the redirected wireless radio frequency signal is reflected by the distinctly configured metasurface associated with the user identity, determining that the user identity is a verified identity;
   receiving, by the system, a multifactor authentication request corresponding to a login attempt based on user input associated with the user identity to a secure site;
   communicating, by the system with a remote service, to obtain an authentication code corresponding to the multifactor authentication request based on the verified identity; and
   completing, by the system, the multifactor authentication request using the authentication code on behalf of the user identity.

2. The method of claim 1, wherein the completing of the multifactor authentication request comprises completing an authentication code input field on an interface via which a representation of the multifactor authentication request is presented via a device associated with the user identity.

3. The method of claim 1, wherein the communicating with the remote service comprises communicating with the remote service via at least one of: a local authenticator application, or a remote backend service.

4. The method of claim 1, further comprising presenting, by the system, at least one of: analytics information related to metasurface interaction with the system, or analytics information related to multifactor authentication based on metasurface interaction with the system.

5. The method of claim 1, further comprising presenting, by the system, a visible indication that the remote service is connected to an authentication service.

6. The method of claim 1, further comprising, in response to determining that the redirected wireless radio frequency signal is not reflected by the unit cells of the distinctly configured metasurface, facilitating, by the system, manual completing of the multifactor authentication request on behalf of the user identity.

7. The method of claim 1, wherein the determining of whether the redirected wireless radio frequency signal based on the transmitted wireless radio frequency signal is reflected by the distinctly configured metasurface associated with the user identity corresponds to a wireless identification mode, and further comprising, in response to determining that the redirected wireless radio frequency signal has not been reflected by the distinctly configured metasurface for a defined period of time, entering, by the system, a standby mode that disables the wireless identification mode until user credentials are received to exit the standby mode and reenable the wireless identification mode.

8. The method of claim 7, further comprising, determining, by the system, a location of the transceiver, and setting, by the system, the defined period of time based on the location.

9. A system, comprising:
   a distinctly configured metasurface, associated with a user identity, that reflects an altered instance of an incoming transmitted signal to a transceiver coupled to a computing device, wherein the altered instance comprises a distinct radiation pattern that verifies the user identity;
   multifactor authentication logic, executing on the computing device, that detects a multifactor authentication request corresponding to a user login attempt to access a site via the computing device; and
   an authentication service communicatively coupled to the multifactor authentication logic,
   wherein the multifactor authentication logic communicates information corresponding to the user identity and the multifactor authentication request to the authentication service, and obtains a multifactor authentication code from the authentication service, and
   wherein the multifactor authentication logic populates an input field, associated with the multifactor authentication request, with the multifactor authentication code.

10. The system of claim 9, wherein the multifactor authentication is a two-factor authentication request.

11. The system of claim 9, wherein the distinctly configured metasurface alters the altered instance of the incoming transmitted signal with a distinct radiation pattern, corresponding to a service tag of the metasurface, that verifies the user identity to the multifactor authentication logic.

12. The system of claim 9, wherein the multifactor authentication logic comprises software code that presents analytics information related to metasurface interaction with the multifactor authentication logic.

13. The system of claim 9, wherein the multifactor authentication logic presents a visible representation indicating that the multifactor authentication logic is communicatively coupled to the authentication service.

14. The system of claim 9, wherein the multifactor authentication logic presents a visible activation status representation indicating that the distinctly configured metasurface has verified the user identity to the multifactor authentication logic.

15. The system of claim 9, wherein the multifactor authentication logic is coupled to peripheral manager software code executing on the computing device, or an applet executing on the computing device.

16. A non-transitory machine-readable medium, comprising executable instructions that, when executed by at least one processor, facilitate performance of operations, the operations comprising:
    determining that a redirected wireless radio frequency signal based on a transmitted wireless radio frequency signal is reflected by a distinctly configured metasurface associated with a user identity;
    receiving a two-factor authentication request based on a login attempt, via user input associated with the user identity, to a secure site;
    communicating the user identity to a remote service to obtain an authentication code corresponding to the multifactor authentication request; and
    populating an input field associated with the multifactor authentication request with the authentication code.

17. The non-transitory machine-readable medium of claim 16, wherein the determining that the redirected wireless radio frequency signal based on the transmitted wireless radio frequency signal is reflected by the distinctly configured metasurface corresponds to a wireless identification mode, and wherein the operations further comprise,
    in response to determining that the redirected wireless radio frequency signal based on the transmitted wireless radio frequency signal has not been reflected by the distinctly configured metasurface for a defined period of time,
    changing from the wireless identification mode to a standby mode that disables the wireless identification mode,
    receiving user credentials while in the standby mode, and
    in response to verifying the credentials as valid, reenabling the wireless identification mode from the standby mode.

18. The non-transitory machine-readable medium of claim 16, wherein the operations further comprise determining location data of a receiver that receives the redirected wireless radio frequency signal, and setting the defined period of time based on the location data.

19. The non-transitory machine-readable medium of claim 16, wherein the operations further comprise determining that a connection to the remote service is via a public Wi-Fi connection, and setting the defined period of time based on the public Wi-Fi connection.

20. The non-transitory machine-readable medium of claim 16, wherein the operations further comprise presenting via a display device, at least one of: analytics information related to the distinctly configured metasurface, a visible representation based on a connection to the remote service, or a visible representation indicating that the user identity is verified for the two-factor authentication request.

* * * * *